United States Patent
Tabuchi et al.

(10) Patent No.: US 8,021,783 B2
(45) Date of Patent: Sep. 20, 2011

(54) LITHIUM MANGANESE-BASED COMPOSITE OXIDE AND METHOD FOR PREPARING THE SAME

(75) Inventors: Mitsuharu Tabuchi, Ikeda (JP); Yoko Nabeshima, Ikeda (JP); Kazuaki Ado, Ikeda (JP); Kuniaki Tatsumi, Ikeda (JP); Tomonari Takeuchi, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1167 days.

(21) Appl. No.: 11/723,427

(22) Filed: Mar. 20, 2007

(65) Prior Publication Data

US 2007/0218360 A1  Sep. 20, 2007

(30) Foreign Application Priority Data

| Mar. 20, 2006 | (JP) | 2006-075776 |
| Aug. 7, 2006 | (JP) | 2006-214351 |
| Sep. 25, 2006 | (JP) | 2006-258178 |

(51) Int. Cl.
*H01M 4/50* (2010.01)
*H01M 4/13* (2010.01)

(52) U.S. Cl. ............ 429/224; 429/218.1; 429/221; 429/231.5

(58) Field of Classification Search ........... 429/122–347
See application file for complete search history.

(56) References Cited

U.S. PATENT DOCUMENTS

| 5,824,285 A * | 10/1998 | Koksbang ............ 423/599 |
| 6,623,890 B2 | 9/2003 | Munakata et al. |
| 2002/0012830 A1 | 1/2002 | Uemura et al. |
| 2002/0110518 A1 * | 8/2002 | Okuda et al. ............ 423/594 |

FOREIGN PATENT DOCUMENTS

| JP | A-08-295518 | 11/1996 |
| JP | A-10-120421 | 5/1998 |
| JP | 2000-260432 | 9/2000 |
| JP | 2002-050401 | 2/2002 |
| JP | 2002-068748 | 3/2002 |
| JP | 2002-121026 | 4/2002 |
| JP | 2002-190301 | 7/2002 |
| JP | A-2002-279987 | 9/2002 |
| JP | A-2004-323331 | 11/2004 |
| JP | 2005-154256 | 6/2005 |
| JP | 2005-268127 | 9/2005 |

(Continued)

OTHER PUBLICATIONS

M. Tabuchi, et al., "Synthesis, Caution Distribution, and Electrochemical Properties of Fe-Substituted Li2MnO3 as a Novel 4 V Positive Electrode Material" in Journal of the Electrochemical Society, 149, (5) A509-A524, 2002.

A. Riou, et al., "Etude Structural De Li2MnO3" in Material Reserch Bulletin, vol. 27, pp. 269-275, (1992).

(Continued)

*Primary Examiner* — Basia Ridley
*Assistant Examiner* — Jonathan G Leong
(74) *Attorney, Agent, or Firm* — Posz Law Group, PLC

(57) ABSTRACT

The present invention provides a lithium manganese-based composite oxide represented by the compositional formula: $Li_{1+x}(Mn_{1-m-n}Fe_mTi_n)_{1-x}O_2$, wherein $0<x<1/3$, $0\leq m\leq 0.75$, $0.01\leq n\leq 0.75$, and $0.01\leq m+n<1$, and comprising a crystal phase of layered rock-salt type structure. The composite oxide is capable of maintaining an average discharge voltage of 3 V or more over long charge/discharge cycles. The composite oxide can be prepared using lower-cost starting materials, and exhibits improved charge/discharge characteristics over conventional low-cost positive electrode materials.

10 Claims, 21 Drawing Sheets

FOREIGN PATENT DOCUMENTS

WO     WO 00/63923     10/2000
WO     WO 2007/007581     1/2007

OTHER PUBLICATIONS

K. Ado, et al., "Preparation of LiFe02 with Alpha-NaFe02- Type Structure Using a Mixed-Alkaline Hydrothermal Method" in J. Electochem. Soc., 144, [7], L177, (1997).

Junji Akimoto et al. *Synthesis and Electrochemical Characteristics of $Li_{0.44}MnO_2$ as a Novel 4 V Cathode Material*, Electrochemical and Solid State Letters, vol. 8, No. 10, 2005, pp. A554-A557.

Guo et al. *Structure and Electrochemical Characteristics of $Li_{0.7}MN_{0.3}O_2$ (M=Ti, V, Zn, Co, Mg, Cr)*, Journal of Alloys and Compounds, vol. 348, 2003, pp. 231-235.

Doeff et al. *Electrochemical and Structural Characterization of titanium-substituted manganese oxides based on $Na_{0.44}MnO_2$*, Journal of Power Sources, vol. 135, 2004, pp. 240-248.

European Search Report dated Jul. 30, 2007 in corresponding European patent application No. 07005305.3.-2119 (and English translation).

\* cited by examiner

LITHIUM MANGANESE-BASED COMPOSITE OXIDE AND METHOD FOR PREPARING THE SAME

BACKGROUND OF THE INVENTION (1) Field of the Invention

The present invention relates to lithium manganese-based composite oxides useful as positive electrode materials for next-generation, low-cost lithium-ion batteries, and a method for preparing such lithium manganese-based composite oxides.

(2) Description of the Related Art

A majority of secondary batteries presently mounted in portable equipment such as cellular phones, notebook computers, etc., in Japan are lithium-ion batteries. Such lithium-ion batteries are also expected to become practical as large batteries for use in electric vehicles, electric load leveling systems, etc., and are therefore increasing in importance.

A lithium-ion battery of today employs a lithium cobalt oxide ($LiCoO_2$) as a typical positive electrode material, and a carbon material such as graphite as a negative electrode material.

In such a lithium-ion battery, the amount of lithium ions that are reversibly deintercalated (i.e., charged) and intercalated (i.e., discharged) into the positive electrode determines the battery capacity, and the voltages during deintercalation and intercalation determine the battery operating voltage. The positive electrode material $LiCoO_2$ is hence an important material for battery constitution associated with the battery performance. The demand for lithium cobalt oxide, therefore, is expected to further grow with the increasing range of applications and increasing size of lithium-ion batteries.

Lithium cobalt oxide, however, contains a large amount of the rare metal, cobalt, thus being a cause of the high material costs of lithium-ion batteries. Further considering the fact that about 20% of cobalt resources are presently used in the battery industry, it seems to be difficult to meet the increasing demand only with positive electrode materials made of $LiCoO_2$.

Lithium nickel oxide ($LiNiO_2$), lithium manganese oxide ($LiMn_2O_4$) and the like have so far been reported as lower-cost positive electrode materials that are less limited in the amounts of the natural sources, and some of which are in practical use as alternative materials. With lithium nickel oxide, however, the battery safety decreases as the deepness of charging increases, and with lithium manganese oxide, trivalent manganese dissolves into an electrolyte during charging/discharging at high temperatures (about 60° C.), causing significant deterioration in battery performance. Accordingly, the use of these materials as alternatives has not yet become prevalent. Another lithium manganese oxide, $LiMnO_2$, has also been proposed as a positive electrode material. However, during charging/discharging, the structure of this material gradually changes to a spinel crystal structure, causing the shape of the charge/discharge curves to greatly change with charge/discharge cycles. $LiMnO_2$, therefore, has also not come into practical use.

Moreover, the possibility of lithium ferrite ($LiFeO_2$), containing iron that is more abundant in the amounts of natural resource, less toxic, and lower cost than manganese and nickel, for use as an electrode material has been explored. However, lithium ferrite obtained by a general method, i.e., mixing sources of iron and lithium, and firing the mixture at high temperatures, hardly becomes charged and discharged, and hence cannot be used as a positive electrode material for lithium-ion batteries.

On the other hand, $LiFeO_2$ obtained by an ion exchange process has been reported to be capable of being charged and discharged (see Japanese Unexamined Patent Publications No. 1998-120421 and No. 1996-295518). This material, however, has an average discharge voltage of 2.5 V or less, which is remarkably lower than the value of $LiCoO_2$ (about 3.7 V), and is hence difficult to use as a substitute for $LiCoO_2$.

The present inventors have already found that a solid solution with the layered rock-salt type structure ($Li_{1+x}(Fe_y Mn_{1-y})_{1-x}O_2$, wherein $0<x<1/3$ and $0<y<1$; hereinafter referred to as "iron-containing $Li_2MnO_3$") comprising lithium ferrite and lithium manganese oxide ($Li_2MnO_3$), which is the second most inexpensive and abundant material after iron, has an average discharge voltage of nearly 4 V, which is comparable to that provided with lithium cobalt oxide, according to charge/discharge tests at room temperature (see Japanese Unexamined Patent Publications No. 2002-68748 and 2002-121026).

Moreover, the inventors have found that a lithium-iron-manganese composite oxide that satisfies specific conditions exhibits increased capacity (150 mAh/g) and stable charge/discharge cycle characteristics compared to $LiMn_2O_4$ during cycling tests at high temperatures (see Japanese Unexamined Patent Publication No. 2005-154256).

As described above, various reports have been made on lithium manganese-based positive electrode materials that can substitute for lithium cobalt-based positive electrode materials; however, for further improvements in charge/discharge characteristics, optimization of the chemical composition, preparation conditions, etc., of positive electrode materials is desired.

SUMMARY OF THE INVENTION

The present invention was accomplished in view of the state of the art described above. A principal object of the invention is to provide a novel material that is capable of maintaining an average discharge voltage of 3 V or more over long charge/discharge cycles, while providing a discharge capacity equal to or higher than that of lithium cobalt oxide-based positive electrode materials, and that can be prepared using lower-cost starting materials that are less limited in the amounts of natural resources, and exhibits improved charge/discharge characteristics over conventional low-cost positive electrode materials.

The present inventors conducted extensive research in order to achieve this object. As a result, it was found that when a novel solid solution of lithium-iron-titanium-manganese-based oxide obtained by substituting a specific amount of Ti for Mn and/or Li in iron-containing $Li_2MnO_3$ is used as a positive electrode material in a lithium-ion battery, the battery exhibits improved charge/discharge characteristics over those obtained using lithium-iron-manganese composite oxides. As a result of further research conducted by the inventors, it was found that the lithium-iron-titanium-manganese-based oxide solid solution exhibits, because of the presence of Ti therein, improved charge/discharge characteristics over those obtained using lithium manganese oxides ($Li_2MnO_3$), even when not containing iron; and that the formation of an impurity ($LiMnO_2$) that adversely affects charge/discharge characteristics can be substantially reduced. The present invention was accomplished based on these findings.

The invention provides a lithium manganese-based composite oxide, a method for preparing the lithium manganese-based composite oxide, a positive electrode material comprising the lithium manganese-based composite oxide for use in a lithium-ion battery, and a lithium-ion battery comprising the lithium manganese-based composite oxide, as summarized below:

1. A lithium manganese-based composite oxide represented by the compositional formula:

$$Li_{1+x}(Mn_{1-m-n}Fe_mTi_n)_{1-x}O_2$$

wherein $0<x<1/3$, $0\leq m\leq 0.75$, $0.01\leq n\leq 0.75$, and $0.01\leq m+n<1$, the composite oxide comprising a crystal phase of layered rock-salt type structure.

2. The lithium manganese-based composite oxide according to Item 1, wherein $0.01\leq n\leq 0.5$ in the compositional formula: $Li_{1+x}(Mn_{1-m-n}Fe_mTi_n)_{1-x}O_2$.

3. The lithium manganese-based composite oxide according to Item 1 or 2, wherein $0<x<1/3$, $0.05\leq m\leq 0.75$, $0.01\leq n\leq 0.75$, and $0.06\leq m+n<1$ in the compositional formula: $Li_{1+x}(Mn_{1-m-n}Fe_mTi_n)_{1-x}O_2$.

4. The lithium manganese-based composite oxide according to any of Items 1 to 3, comprising a crystal phase of layered rock-salt type structure and a crystal phase of cubic rock-salt type structure.

5. A method for preparing a lithium manganese-based composite oxide as defined in any of Items 1 to 4, comprising forming a precipitate by alkalizing an aqueous solution containing a manganese compound, a titanium compound, and an iron compound; hydrothermally treating the precipitate along with an oxidizing agent and a water-soluble lithium compound under alkaline conditions; and firing the hydrothermally treated product in the presence of a lithium compound.

6. A positive electrode material for a lithium-ion battery, comprising a lithium manganese-based composite oxide represented by the compositional formula:

$$Li_{1+x}(Mn_{1-m-n}Fe_mTi_n)_{1-x}O_2$$

wherein $0<x<1/3$, $0\leq m\leq 0.75$, $0.01\leq n\leq 0.75$, and $0.01\leq m+n<1$, the composite oxide comprising a crystal phase of layered rock-salt type structure.

7. A lithium-ion battery, comprising a positive electrode material comprising a lithium manganese-based composite oxide represented by the compositional formula:

$$Li_{1+x}(Mn_{1-m-n}Fe_mTi_n)_{1-x}O_2$$

wherein $0<x<1/3$, $0\leq m\leq 0.75$, $0.01\leq n\leq 0.75$, and $0.01\leq m+n<1$, the composite oxide comprising a crystal phase of layered rock-salt type structure.

BRIEF DESCRIPTION OF THE DRAWINGS

FIG. 11 (b) is a graph illustrating the initial discharge characteristics of a coin-type lithium cell of each of the aforementioned types measured at −20° C. and a current density of 8.5 mA/g to 2.0 V.

FIG. 14 (b) is a graph illustrating the initial discharge characteristics of a coin-type lithium cell of each of the aforementioned types measured to 2.0 V at −20° C.

FIG. 15 (b) is a graph illustrating the initial discharge characteristics of a coin-type lithium cell of each of the aforementioned types measured to 2.0 V at −20° C. and a current density of 8.5 mA/g.

FIG. 19 (b) is a graph illustrating the initial discharge characteristics of a coin-type lithium cell of each of the aforementioned types measured to 2.0 V at −20° C. and a current density of 8.5 mA/g.

DETAILED DESCRIPTION OF THE INVENTION

The lithium manganese-based composite oxide according to the invention is a novel compound represented by the compositional formula: $Li_{1+x}(Mn_{1-m-n}Fe_mTi_n)_{1-x}O_2$, wherein $0<x<\frac{1}{3}$, $0\leq m\leq 0.75$, $0.01\leq n\leq 0.75$, and $0.01\leq m+n<1$. This compound is basically composed of a rock-salt type structure, which is a typical crystal structure of oxides, and comprises a crystal phase of layered rock-salt type structure similar to that of a known compound $LiCoO_2$. Provided that it comprises a crystal phase of layered rock-salt type structure, the lithium manganese-based composite oxide of the invention may also be a mixture of phases that include a crystal phase of another rock-salt type structure (e.g., cubic rock-salt type structure) having a different cation distribution. A lithium manganese-based composite oxide obtained according to the method via a hydrothermal reaction described below comprises a crystal phase of cubic rock-salt type structure similar to that of $\alpha$-$LiFeO_2$, in addition to a crystal phase of layered rock-salt type structure. The composite oxide, in either of these phases, is considered to exhibit excellent charge/discharge characteristics. In this case, the proportion (by weight) of the crystal phase of layered rock-salt type structure to the crystal phase of cubic rock-salt type structure is typically from about 10:90 to about 90:10.

Figure 1:
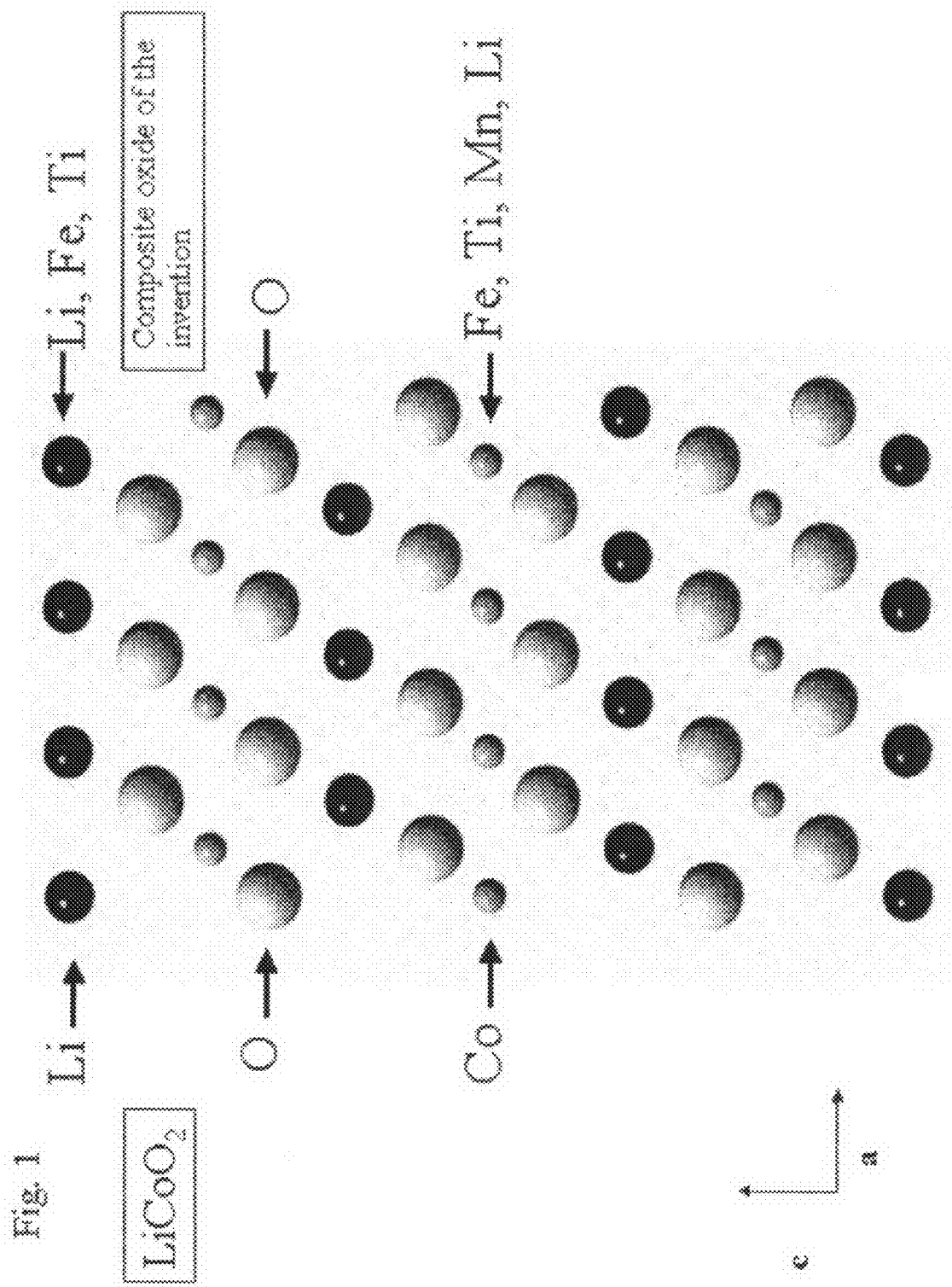
FIG. 1 is a schematic diagram depicting a crystal phase of layered rock-salt type structure in the crystal phases of the lithium manganese-based composite oxide according to the invention.
Figure 2:
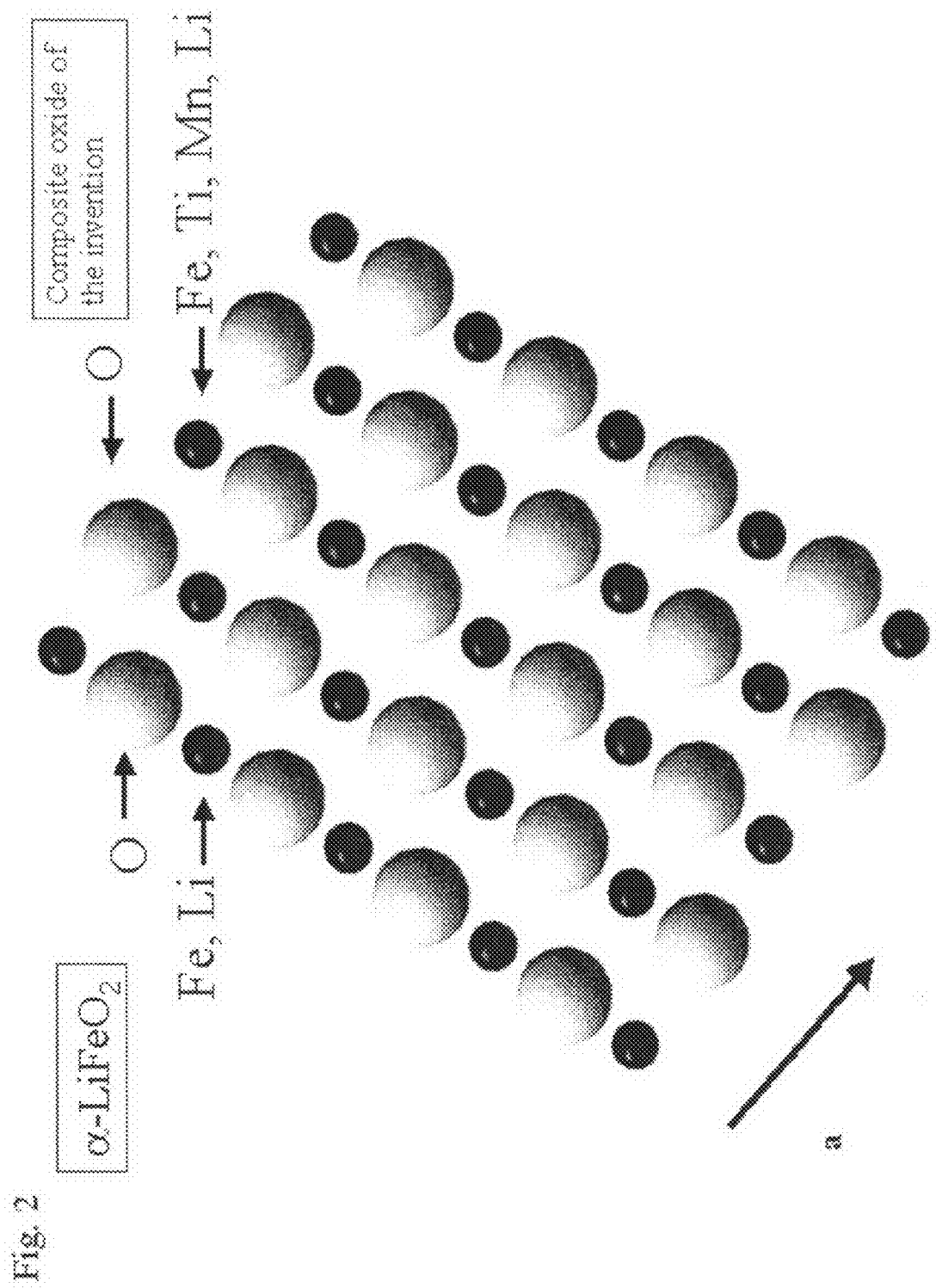
FIG. 2 is a schematic diagram depicting a crystal phase of cubic rock-salt type structure in the crystal phases of the lithium manganese-based composite oxide according to the invention.

FIG. 1 is a schematic diagram depicting a crystal phase of layered rock-salt type structure of the crystal phases of the lithium manganese-based composite oxide according to the invention; and FIG. 2 is a schematic diagram depicting a crystal phase of cubic rock-salt type structure of the crystal phases of the lithium manganese-based composite oxide according to the invention.

The left side of FIG. 1 indicates the elements contained in the layers of the crystal of $LiCoO_2$; and the right side of FIG. 1 indicates the elements contained in the layers of the crystal of the composite oxide of the invention. The cubic rock-salt type structure, which is referred to as "NaCl structure", corresponds to a structure as shown in FIG. 2, wherein all of the cations shown in FIG. 1 exist on the same crystallographic site.

Referring back to FIG. 1, $LiCoO_2$ has a crystal structure in which Co ions and Li ions are arranged two-dimensionally along the a-axis, and stacked alternately along the c-axis, in the interstitial positions of the octahedral structure of cubic close packed oxide ions. On the other hand, in the crystal phase of layered rock-salt type structure of the lithium manganese-based oxide of the invention, Li ions, Fe ions, Ti ions, and Mn ions are present in the same layer as the Co layer of $LiCoO_2$, and the ions in the Li layer are partially substituted by Fe ions and Ti ions.

Layered rock-salt type $LiFeO_2$ exists in which all of the ions in the Co layer of $LiCoO_2$ are substituted by Fe ions. This material, however, is known to have little charge/discharge capacity (see K. Ado, M. Tabuchi, H. Kobayashi, H. Kageyama, O. Nakamura, Y. Inaba, R. Kanno, M. Takagi and Y. Takeda; J. Electrochem. Soc., 144, [7], L177, (1997)).

On the other hand, as previously described, Fe ions of the lithium manganese-based oxide of the invention are diluted with Li, Ti and Mn ions that coexist in the Co layer. This dilution of iron ions is a key requirement for attaining a composite oxide having sufficient charge/discharge capacity. Fe and Ti ions are often present also in the Li layer, which is because lithium ferrite and lithium titanium oxide tend to form the cubic rock-salt type structure (FIG. 2).

It is particularly important for the composite oxide of the invention to contain a specific amount of Ti ions. If a lithium-iron-manganese composite oxide not containing Ti ions is fired at high temperatures during preparation, the oxide tends to show a lack of Li due to volatility. Because Li contained in the oxide is a component that contributes to charging/discharging, a lack of Li may deteriorate the charge/discharge characteristics. One reason for the significantly improved charge/discharge characteristics of the composite oxide of the invention over those obtained with lithium-iron-manganese composite oxides is believed to be that the presence of Ti remarkably prevents a lack of Li, thereby increasing the Li component contributing to charging/discharging. Another reason for the improved charge/discharge characteristics is believed to be that the presence of Ti ions tends to reduce the primary particle size and increase the specific surface area, thus resulting in finer particles. Yet another reason for the improved charge/discharge characteristics is believed to be that the presence of Ti ions prevents the formation of $LiMnO_2$, an impurity characteristic of manganese-based materials, even when firing for a short period.

The amount of Fe ions (the value m: Fe/(Fe+Mn+Ti)) in the lithium manganese-based composite oxide of the invention is about 75 mol % or less based on the amount of metal ions except Li ions ($0\leq$Fe/(Fe+Mn+Ti)$\leq 0.75$), and preferably about 60 mol % or less ($0\leq$Fe/(Fe+Mn+Ti)$\leq 0.6$). The presence of excess Fe ions is not preferable for satisfactory battery performance, because it causes not only insufficient dilution of Fe ions, but also the presence of a large amount of Fe ions in the Li layer not contributing to charging/discharging.

Basically as with Fe ions, it is believed that Ti ions in the lithium manganese-based composite oxide of the invention are present in the layered rock-salt type structure by substitution of Mn and Li ions. Ti ions are believed to be present in the tetravalent state to prevent a lack of Li and change the powder properties, as described above. The amount of Ti ions (the value n: Ti/(Fe+Mn+Ti)) in the composite oxide of the invention is from about 1 to about 75 mol % based on the amount of metal ions except Li ions ($0.01\leq$Ti/(Fe+Mn+Ti)$\leq 0.75$), preferably from about 1 to 50 mol % ($0.01\leq$Ti/(Fe+Mn+Ti)$\leq 0.5$) and more preferably from about 6 to about 50 mol % ($0.06\leq$Ti/(Fe+Mn+Ti)$\leq 0.5$). The use of a large amount of Ti ions not contributing to charging/discharging is not preferable, because it causes reduction in the charge/discharge capacity. Conversely, the use of too small an amount of Ti ions is not also preferable, because effects such as the prevention of a lack of Li, etc., cannot be attained to a sufficient degree.

The total amount of Fe ions and Ti ions in the lithium manganese-based composite oxide of the invention is in the range of about $0.01 \leq m+n<1$ in the aforementioned compositional formula, and preferably about $0.25 \leq m+n \leq 0.8$.

The lithium manganese-based composite oxide of the invention, even when containing Fe ions, can exhibit charge/discharge performance equal to that obtained without containing Fe ions. Accordingly, when containing iron that is inexpensive and abundant in the amounts of a natural resource, the composite oxide of the invention can be a low-cost positive electrode material with excellent charge/discharge performance. In this case, the amount of Fe ions (value m) may be, for example, about $0.05 \leq m \leq 0.75$, and preferably about $0.1 \leq m \leq 0.75$. The total amount of Fe ions and Ti ions is, for example, in the range of about $0.06 \leq m+n<1$ in the aforementioned compositional formula, and preferably about $0.25 \leq m+n \leq 0.8$.

So long as the lithium manganese-based composite oxide of the invention is capable of maintaining the layered and cubic rock-salt type structures, x in the formula $Li_{1+x}(Mn_{1-m-n}Fe_m Ti_n)_{1-x}O_2$ may be a value between 0 and $\frac{1}{3}$ according to the average valence of the transition metal ions. Preferably, x is in the range of 0.05 to 0.30.

The composite oxide of the invention may further comprise impurity phases of lithium hydroxide, lithium carbonate, a titanium compound, an iron compound, a manganese compound (as well as their hydrates), etc., to such an extent that the charge/discharge characteristics are not seriously affected (a maximum of about 10 mol %).

The composite oxide of the invention can be prepared by a general synthetic process, such as a hydrothermal reaction, a solid phase reaction, etc. A process utilizing a hydrothermal reaction is especially preferable, because it enables a composite oxide with excellent charge/discharge performance to be easily formed.

One typical process for forming the composite oxide of the invention via a hydrothermal reaction is as follows. A solution of metal compounds for producing iron, manganese and titanium ions dissolved in water, a water/alcohol mixture or the like is first alkalized to form a precipitate therefrom. An oxidizing agent and a water-soluble lithium compound are then added to the precipitate, and the mixture is hydrothermally treated under alkaline conditions, so as to obtain a target lithium manganese-based composite oxide. The lithium manganese-based composite oxide may then be mixed with a lithium compound and fired. During this step, the amount of lithium compound and firing conditions are adjusted so as to control the powder properties such as particle diameter, Li content, etc, to obtain the target lithium manganese-based composite oxide. This process is described below in greater detail.

Any kind of suitable iron compound, manganese compound, and titanium compound may be used, so long as they can form an aqueous solution containing these compounds. Typically, compounds that are soluble in water may be used. Specific examples of such water-soluble compounds include water-soluble salts such as chlorides, nitrates, sulfates, oxalates, acetates and the like, hydroxides, etc. Such water-soluble compounds may be in the form of anhydrides or hydrates. Oxides and other water-insoluble compounds are also usable as the metal sources for aqueous solutions by, for example, dissolving them with acids such as hydrochloric acid and the like. A single or a combination of starting compounds may be used for each of the metal sources.

The proportion of the iron compound, manganese compound and titanium compound in the aqueous solution may be such that the ratio of these metal elements corresponds to that of a target composite oxide.

The concentration of each of these compounds in the aqueous solution may suitably be determined so as to allow the formation of a uniform aqueous solution and smooth formation of a coprecipitate. The total concentration of the iron, manganese and titanium compounds is typically from about 0.01 to about 5 mol/L, and preferably about 0.1 to about 2 mol/L.

Water may be used singly as solvent for the aqueous solution, or a water/alcohol mixture containing a water-soluble alcohol, such as methanol, ethanol, etc., may be used. The use of a water/alcohol solvent mixture allows the formation of a precipitate at temperatures below 0° C. The amount of alcohol may suitably be determined according to the intended temperature at which a precipitate is formed, but is typically suitable from about 50 wt parts or less per 100 wt parts of water.

The solution may be alkalized in order to form a precipitate (coprecipitate) therefrom. The conditions for forming a satisfactory precipitate cannot be generalized, since they depend upon the kind, concentration, etc., of each compound contained in the solution; but typically, the aqueous solution preferably has a pH of about 8 or more, and more preferably about 11 or more.

The aqueous solution may be alkalized by any suitable process, typically by adding an alkali or an aqueous solution containing an alkali to the aqueous solution containing metal compounds. Alternatively, a coprecipitate can be formed by adding the aqueous solution containing metal compounds to an aqueous solution containing an alkali.

Examples of alkalis used for alkalizing the aqueous solution include alkali metal hydroxides such as potassium hydroxide, sodium hydroxide, lithium hydroxide and the like, ammonia, etc. When such an alkali is used in the form of an aqueous solution, the concentration of the aqueous solution may, for example, be from about 0.1 to about 20 mol/L, and preferably about 0.3 to about 10 mol/L. As with the aqueous solution containing metal compounds described above, the alkali may be dissolved in a water/alcohol solvent mixture containing a water-soluble alcohol.

During the formation of a precipitate, the temperature of the aqueous solution is from about −50 to about +15° C., and preferably from about −40 to about +10° C., so as to prevent the formation of spinel ferrite due to heat of neutralization during the reaction, thus resulting in easy formation of a uniform coprecipitate.

After alkalizing the aqueous solution, the precipitate is preferably oxidized and aged by bubbling air through the reaction solution at about 0 to about 150° C. (preferably about 10 to about 100° C.) for about 1 to about 7 days (preferably about 2 to about 4 days).

The resulting precipitate can be purified by washing with distilled water or the like to remove excess alkali component, residual reactants, etc., and then filtering.

The precipitate thus obtained is then hydrothermally treated along with an oxidizing agent and a water-soluble lithium compound under alkaline conditions. The hydrothermal treatment can be performed by heating an aqueous solution containing the precipitate, oxidizing agent and water-soluble lithium compound under alkaline conditions. Heating may usually be performed in a sealed container.

The content of the precipitate containing iron, manganese and titanium in the aqueous solution used in the hydrothermal reaction is preferably from about 1 to about 100 g per liter of water, and more preferably from about 10 to about 80 g.

Examples of water-soluble lithium compounds include water-soluble lithium salts such as lithium chloride, lithium nitrate and the like, lithium hydroxide, etc. Such water-soluble lithium compounds may be used singly or in combination, in the form of anhydrides or hydrates.

The amount of water-soluble lithium compound is preferably such that the molar ratio of the lithium to the total moles of Fe, Mn and Ti in the precipitate product (Li/(Fe+Mn+Ti)) is from about 1 to about 10, and more preferably from about 3 to about 7.

The concentration of the water-soluble lithium compound is preferably from about 0.1 to about 10 mol/L, and more preferably from about 1 to about 8 mol/L.

Any suitable oxidizing agent that decomposes and generates oxygen during the hydrothermal reaction may be used. Specific examples include potassium chlorate, lithium chlorate, sodium chlorate, hydrogen peroxide solution, etc.

The concentration of the oxidizing agent is preferably from about 0.1 to about 10 mol/L, and preferably from about 0.5 to about 5 mol/L.

Typically, during the hydrothermal reaction, the aqueous solution preferably has a pH of about 8 or more, and more preferably about 11 or more.

When the aqueous solution containing the precipitate, oxidizing agent and water-soluble lithium compound is under alkaline conditions, the solution may be directly heated; if, however, the aqueous solution has a low pH value, the pH value may be increased by adding, for example, an alkali metal hydroxide such as potassium hydroxide, sodium hydroxide or the like, ammonia, or the like.

The hydrothermal reaction can be carried out using an apparatus generally used for hydrothermal reactions (e.g., a commercially available autoclave).

The hydrothermal reaction may be carried out under any suitable conditions, but typically at about 100 to about 300° C. for about 0.1 to about 150 hours, and preferably at about 150 to about 250° C. for about 1 to about 100 hours.

After the completion of the hydrothermal reaction, the reaction product is typically washed to remove residues such as remaining lithium compound, etc. Washing can be done with, for example, water, water/alcohol, acetone, etc. The product is then filtered and dried at a temperature of, for example, 80° C. or more (usually about 100° C.) to obtain a lithium manganese-based composite oxide.

In accordance with the invention, the lithium manganese-based composite oxide obtained as above can be fired together with a lithium compound so as to control the Li content and powder properties, thus resulting in a target lithium manganese-based composite oxide basically composed of a rock-salt type structure.

The lithium compound may be any suitable compound containing lithium, and specific examples include lithium salts such as lithium chloride, lithium nitrate, lithium acetate and the like, lithium hydroxide, hydrates thereof, etc. The amount of lithium compound may be from about 0.01 to about 2 mol per mol of lithium manganese-based composite oxide obtained via a hydrothermal process.

Typically, for improved reactivity, the lithium compound and the lithium manganese-based composite oxide obtained via a hydrothermal process are preferably pulverized and mixed before firing. Pulverization may be performed to such an extent that the mixture does not contain coarse particles and assumes a uniform color tone.

While the lithium compound may be used in the form of a powder, aqueous solution or the like, it is preferably used in an aqueous solution form in order to ensure the homogeneity of the reaction. In this case, the concentration of the aqueous solution of lithium compound may typically be from about 0.1 to about 10 mol/L.

Firing may be performed in any suitable atmosphere such as air, an oxidizing atmosphere, an inert atmosphere, a reducing atmosphere, and other types of atmospheres. The firing temperature is preferably from about 200 to about 1000° C., and more preferably from about 300 to about 800° C. The firing time, including the time it takes until the firing temperature is attained, is preferably from about 0.1 to about 100 hours, and more preferably from about 0.5 to about 60 hours.

After the completion of firing, the fired product is usually washed with water, a solvent or the like to remove excess lithium compound. The resulting product is then filtered and may be dried by heating at a temperature of, for example, 80° C. or more, and preferably about 100° C.

By further repeating, as necessary, a series of procedures consisting of pulverizing the heat-dried product, adding a lithium compound, firing, washing, and drying, the excellent characteristics of the lithium manganese-based composite oxide (i.e., stable charge/discharge characteristics in the operating voltage region, high capacity, etc., provided as a positive electrode material for use in lithium-ion batteries) can further be improved.

A lithium-ion battery comprising the lithium manganese-based composite oxide of the invention can be manufactured according to a known method. Such a lithium-ion battery is assembled according to a conventional method, using a positive electrode material comprising the novel composite oxide of the invention; a negative electrode material comprising a known material such as metallic lithium, a carbon-based material (e.g., activated carbon, graphite, etc.) or the like; an electrolyte of a solution including a lithium salt such as lithium perchlorate, $LiPF_6$ or the like dissolved in a known solvent such as ethylene carbonate, dimethyl carbonate or the like; and other known battery-constituting elements.

As explained above, in accordance with the invention, a novel composite oxide useful as a positive electrode material is obtainable from the low-cost starting materials. Such a novel composite oxide is capable of maintaining an average discharge voltage of 3 V or more, while exhibiting a discharge capacity (250 mAh/g or more) and an energy density (800 mWh/g or more) which are equal to or higher than those obtained with lithium cobalt oxide-based positive electrode materials.

Such a high capacity provided by the lithium manganese-based composite oxide of the invention is attributed to the shape of the discharge curve that gradually decreases toward the discharge cut-off voltage (2.0 or 1.5 V); therefore a higher capacity can be readily achieved by reducing the discharge cut-off voltage to about 2.0 or about 1.5 V.

Moreover, the lithium manganese-based composite oxide of the invention has a discharge capacity as high as 200 mAh/g or more at 30° C., 150 mAh/g or more at 0° C., or 100 mAh/g or more at −20° C., thus exhibiting excellent performance even in a low-temperature environment. In addition, the lithium manganese-based composite oxide of the invention has a discharge capacity of about 90 mAh/g or more even at a current density as high as 637.5 mA/g (corresponding to 5 C), thus being very suitable as a positive electrode material not only for small consumer-oriented lithium-ion batteries, but also for large lithium-ion batteries mounted in vehicles, etc.

In particular, the composite oxide of the invention is composed of fine particles, and also contains a large amount of the component contributing to charging/discharging, because a lack of Li caused by heat treating at high temperatures is prevented. These features make the composite oxide of the invention highly utilizable and exhibit excellent charge/discharge characteristics.

The lithium manganese-based composite oxide of the invention with the above-described excellent performance is very useful as a high-capacity, low-cost positive electrode material for use in lithium-ion batteries.

EXAMPLES

The invention will become even more apparent by way of Examples and Comparative Examples described below.

Example 1

To 500 mL of distilled water was added 40.40 g of an iron (III) nitrate nonahydrate, 19.79 g of a manganese (II) chloride tetrahydrate, and 40.00 g of a 30% aqueous titanium sulfate solution (total amount: 0.25 mol, Fe:Mn:Ti molar ratio: 1:1:0.5), and thoroughly dissolved. An aqueous lithium hydroxide solution (a solution of 50 g of a lithium hydroxide monohydrate dissolved in 500 mL of distilled water) was prepared in a separate beaker. After pouring this aqueous lithium hydroxide solution into a titanium beaker, 200 mL of ethanol was added and stirred. The lithium hydroxide solution was then allowed to stand in a thermostat at a constant temperature of $-10°$ C. The aqueous solution of metal salts obtained above was then added dropwise into the aqueous lithium hydroxide solution over a period of 2 to 3 hours, thus forming a Fe—Mn—Ti precipitate. After confirming that the solution had been made completely alkaline (a pH of 11 or more), the solution containing the coprecipitate was oxidized while stirring by bubbling air through the solution at room temperature for 2 days, to age the precipitate.

The resulting precipitate was washed with distilled water and filtered. The precipitate product was then placed into a polytetrafluoroethylene beaker along with 50 g of a lithium hydroxide monohydrate, 50 g of potassium chlorate, 309 g of potassium hydroxide and 600 mL of distilled water and stirred well. The mixture had a pH of 11 or more. The mixture was then placed in a hydrothermal reactor (autoclave) and hydrothermally treated at 220° C. for 8 hours.

After the completion of the hydrothermal treatment, the reactor was cooled to about room temperature, and the beaker containing the hydrothermally reacted solution was taken out from the autoclave. The formed precipitate was washed with distilled water to remove salts such as excess lithium hydroxide and filtered to obtain a powdery product (lithium manganese-based composite oxide).

The filtered powder was mixed with an aqueous lithium hydroxide solution of 5.25 g of a lithium hydroxide monohydrate dissolved in 100 mL of distilled water and stirred. The mixture was then dried at 100° C. overnight and pulverized to form a powder.

The powder was then heated in air to 550° C. over 1 hour. After firing at that temperature for 1 minute, the powder was cooled to about room temperature in a furnace, and then the fired product was washed with distilled water to remove excess lithium salts, filtered and dried to obtain the target iron- and titanium-containing $Li_2MnO_3$ as a powdery product.

Figure 3:
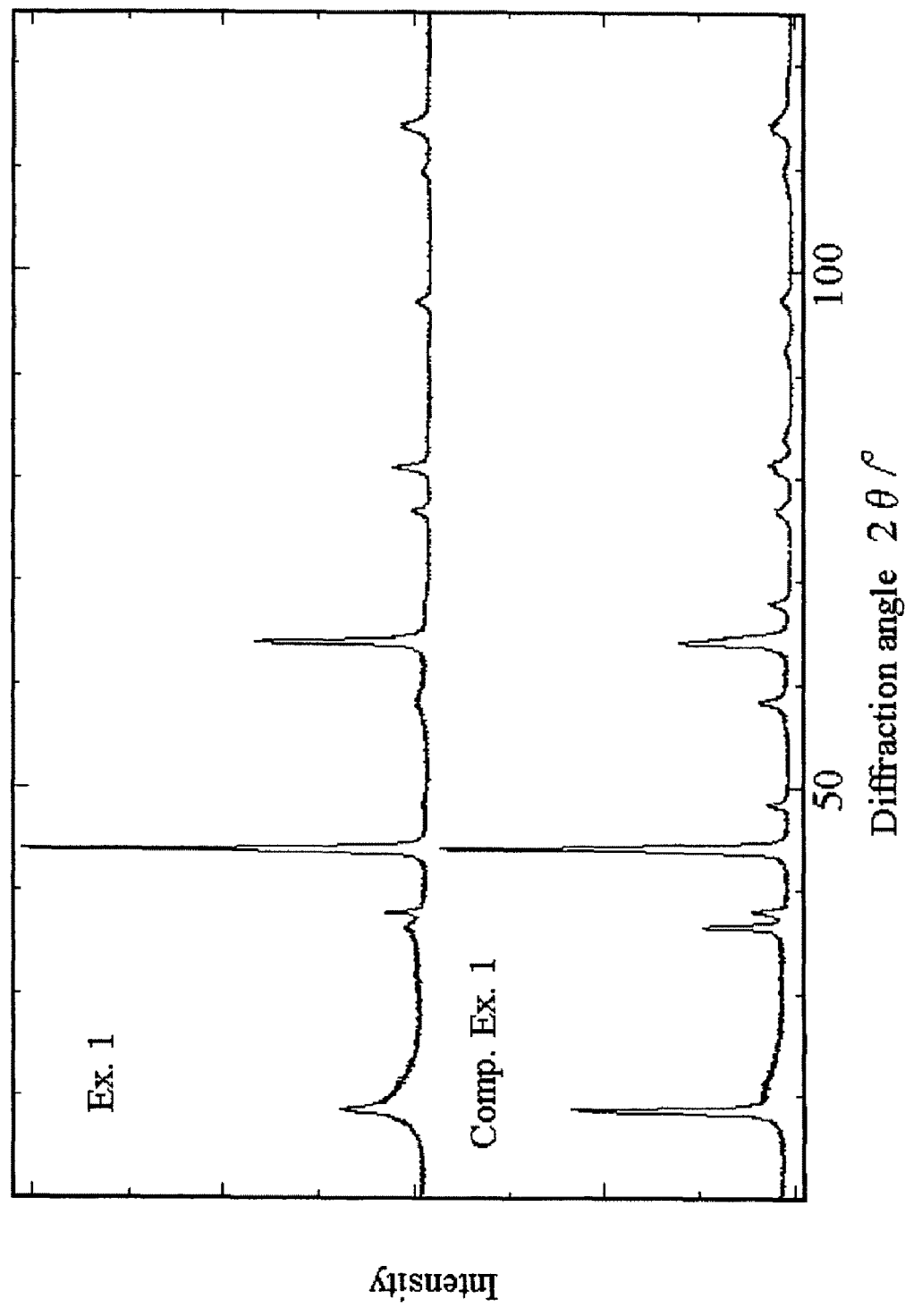
FIG. 3 is a graph showing the X-ray diffraction patterns of samples according to Example 1 and Comparative Example 1.

The X-ray diffraction pattern of this product is shown in FIG. 3. According to a Rietveld analysis (using a program named "RIETAN-2000"), all of the peaks were indexed by a crystal phase with a unit cell (R $\overline{3}$ m) of layered rock-salt type iron-containing $Li_2MnO_3$ (first phase: a=2.888(4) Å, c=14.197(11) Å) and a crystal phase with a unit cell (Fm$\overline{3}$m) of cubic rock-salt type $\alpha$-$LiFeO_2$ (second phase: a=4.1107(3) Å, the weight ratio of the first and second phases: 24:76).

Chemical analysis (Table 1 below) shows that the Fe and Ti contents are 40 mol % (value m) and 20 mol % (value n), respectively, which are close to the amounts supplied, and that the value x calculated from the value Li/(Mn+Fe+Ti) is 0.17; hence it was confirmed that iron- and titanium-containing $Li_2MnO_3$ ($Li_{1.17}(Fe_{0.40}Mn_{0.40}Ti_{0.20})_{0.83}O_2$) was obtained in Example 1.

Figure 4:
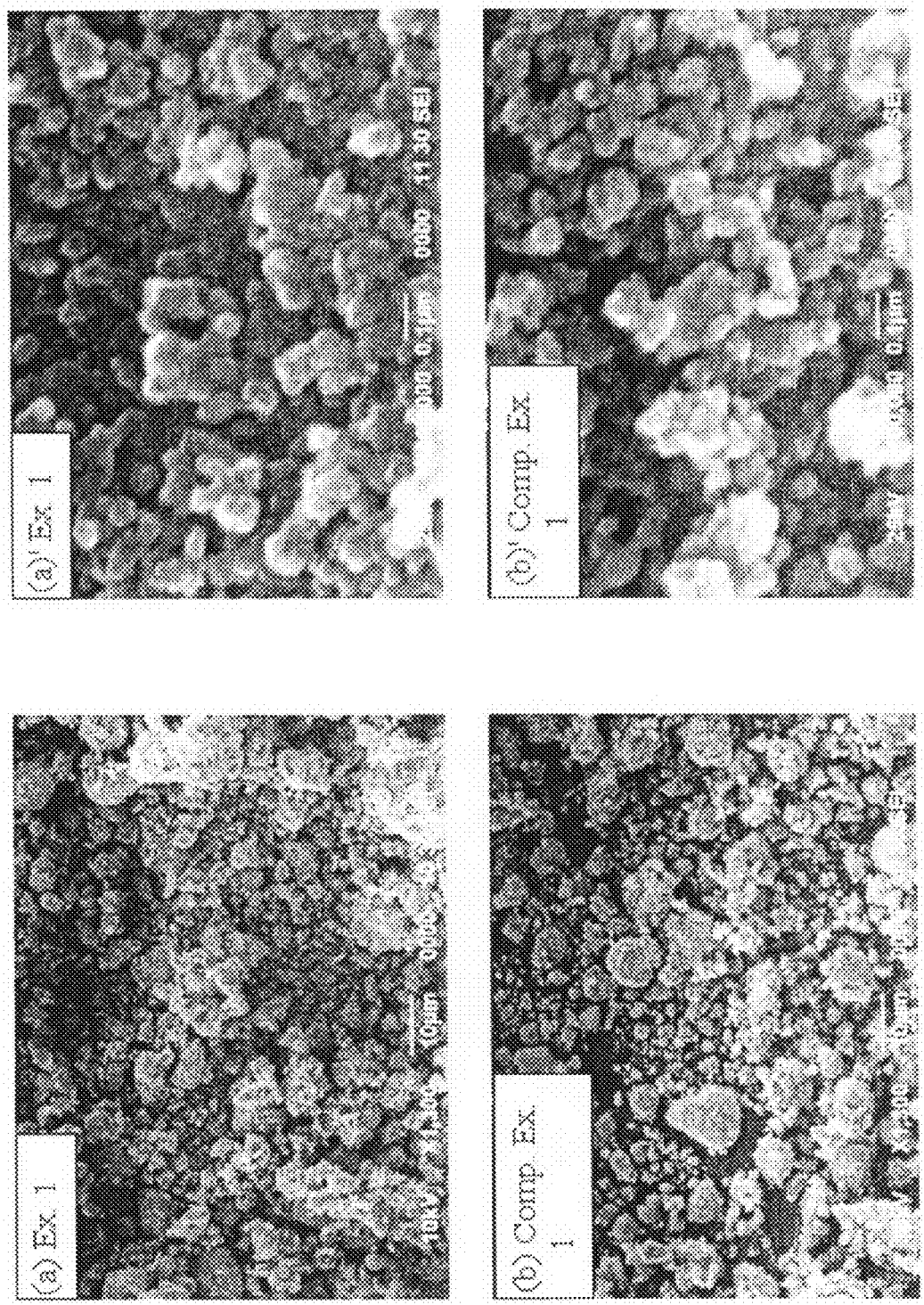
FIGS. 4 (a), (a)' and 4 (b), (b)' are electronic image-processed electron micrographs of iron- and titanium-containing $Li_2MnO_3$ according to Example 1 and iron-containing $Li_2MnO_3$ according to Comparative Example 1, respectively.

FIGS. 4 (*a*) and (*a*)' show electronic image-processed electron micrographs of the iron- and titanium-containing $Li_2MnO_3$ obtained as the final product in Example 1. It is clearly seen from FIGS. 4 (*a*) and (*a*)' that the iron- and titanium-containing $Li_2MnO_3$ was formed in accordance with Example 1 wherein particles with a diameter of 100 nm or less form agglomerates with a diameter of about 1 to about 15 μm.

Comparative Example 1

A precipitate was formed using an aqueous Fe—Mn solution prepared by adding 50.50 g of an iron (III) nitrate nonahydrate and 24.74 g of a manganese (II) chloride tetrahydrate (total amount: 0.25 mol, Fe:Mn molar ratio: 1:1) to 500 mL of distilled water. The precipitate was then aged, hydrothermally treated, washed with water and filtered to obtain a lithium manganese-based composite oxide. The above procedure was performed under the same conditions as in Example 1.

The powder thus obtained was then mixed with an aqueous lithium hydroxide solution of 5.25 g of a lithium hydroxide monohydrate dissolved in 100 mL of distilled water, dried at 100° C. and pulverized to form a powdery product. The powder was then heated in air to 550° C. over 1 hour. After firing at that temperature for 1 minute, the powder was cooled to about room temperature in a furnace, and then the fired product was washed with distilled water to remove excess lithium salts, filtered and dried to obtain a target iron-containing $Li_2MnO_3$ as a powdery product.

The X-ray diffraction pattern of this product is shown in FIG. 3. All of the diffraction peaks were indexed by a crystal phase with a unit cell (R $\overline{3}$ m) of a layered rock-salt type structure (first phase: a=2.8867(5) Å, c=14.317(2) Å) and a crystal phase with a unit cell (Fm$\overline{3}$m) of cubic rock-salt type $\alpha$-$LiFeO_2$ (second phase: a=4.1091(6) Å, the weight ratio of the first and second phases: 58:42). The results confirmed the formation of a lithium-iron-manganese composite oxide comprising a layered rock-salt type crystal phase. The lattice parameters of the layered rock-salt type crystal phase obtained were close to the values reported for an existing lithium-iron-manganese composite oxide (lattice parameters: a=2.882 Å, c=14.287 Å) (M. Tabuchi, A. Nakashima, H. Shigemura, K. Ado, H. Kobayashi, H. Sakaebe, H. Kageyama, T. Nakamura, M. Kohzaki, A. Hirano and R. Kanno; Journal of the Electrochemical Society, 149, A509-A524, 2002).

Chemical analysis (Table 1 below) shows that the Fe content (value m) is 50 mol % as supplied, and the value x calculated from the value Li/(Mn+Fe) is 0.16; hence it was confirmed that the sample obtained in Comparative Example 1 has an average composition of $(Li_{1.16}(Fe_{0.5}Mn_{0.5})_{0.84}O_2)$.

The results of chemical analysis confirmed that the sample according to Comparative Example 1 had a Li content lower than that of the sample according to Example 1 even though the firing conditions were the same, showing a lack of Li due to the absence of Ti.

FIGS. 4(b) and (b)' show electronic image-processed electron micrographs of the iron-containing $Li_2MnO_3$ obtained as the final product in Comparative Example 1. It is confirmed from FIG. 4 that the iron-containing $Li_2MnO_3$ was formed in accordance with Comparative Example 1 wherein particles with a diameter of 100 nm or less form agglomerates with a diameter of about 1 to about 15 μm, as in Example 1.

The results clarified that the sample according to Comparative Example 1 showed a lack of Li, even though the preparation conditions were the same as in Example 1 except that titanium sulfate was not added. It was therefore confirmed that the effect of preventing a lack of Li can be achieved by the presence of titanium ions, as in Example 1. Table 1 below presents the results of elemental analysis for the samples according to Example 1 and Comparative Example 1 described above.

TABLE 1

| | Li/wt % | Fe/wt % | Mn/wt % | Ti/wt % | In the compositional formula $Li_{1+x}(Mn_{1-m-n}Fe_mTi_n)_{1-x}O_2$ | | |
|---|---|---|---|---|---|---|---|
| | | | | | value x | value m | value n |
| Ex. 1 | 9.28 | 21.3 | 20.9 | 8.84 | 0.17 | 0.40 | 0.20 |
| Comp. Ex. 1 | 9.07 | 26.8 | 26.0 | — | 0.16 | 0.50 | — |

Charge/Discharge Test

Coin-type lithium cells were prepared, each using a positive electrode material obtained by dry-blending 20 mg of a composite oxide according to Example 1 or composite oxide according to Comparative Example 1 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and diethyl carbonate. The charge/discharge characteristics of each type of lithium cell were studied at 60° C. (voltage range: 2.5-4.5 V, current density: 42.5 mA/g). Each measurement was started from the beginning of charging the cell.

Figure 5:
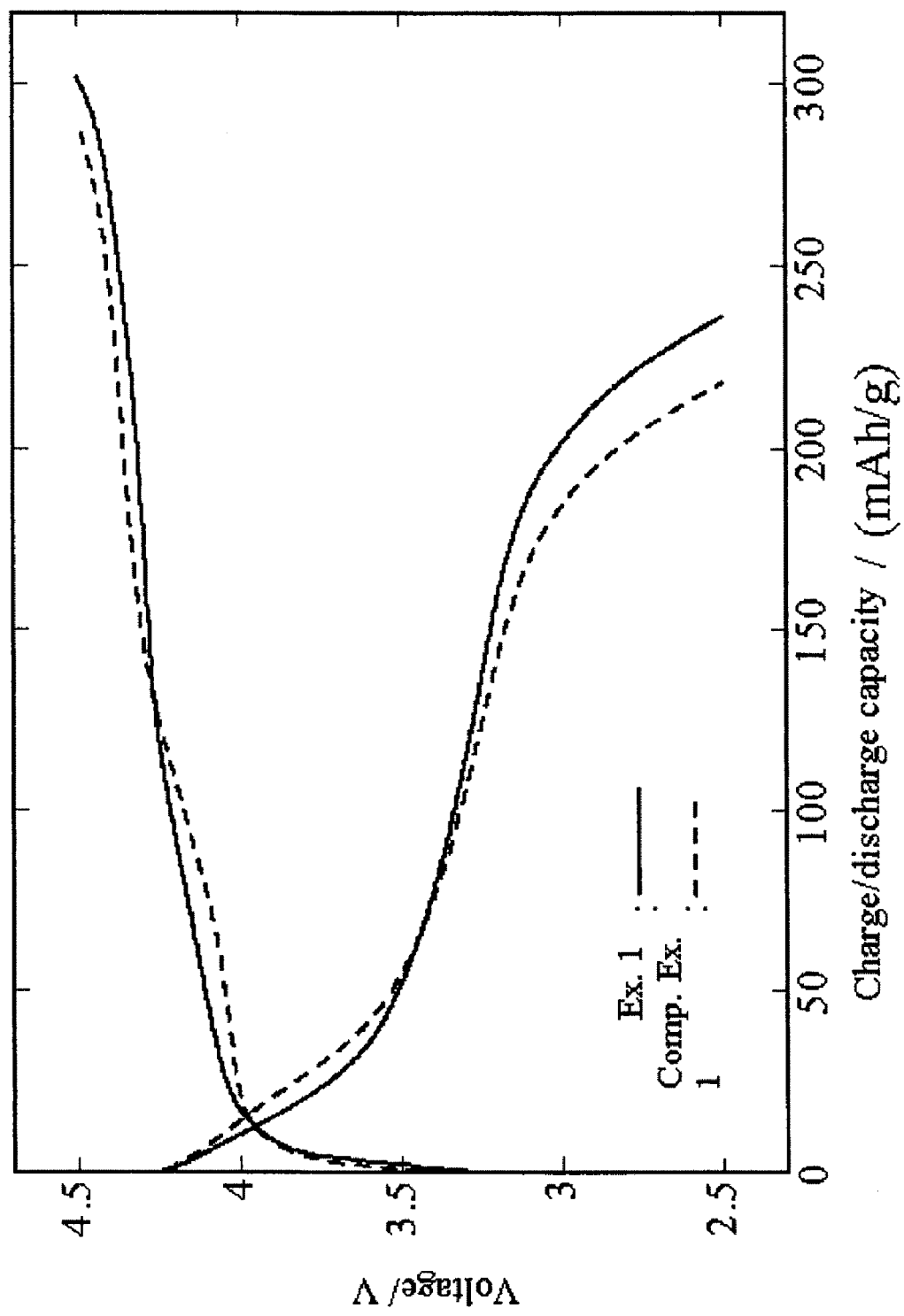
FIG. 5 is a graph illustrating the initial charge/discharge characteristics of coin-type lithium cells each using a sample according to Example 1 or Comparative Example 1 as positive electrode materials measured at 60° C.

FIG. 5 is a graph illustrating the initial charge/discharge characteristics of each type of lithium cell using the positive electrode material according to Example 1 or Comparative Example 1. In FIG. 5, the upward curves correspond to the charge curves, and the downward curves correspond to the discharge curves. It is clear from FIG. 5 that the cell using the iron- and titanium-containing $Li_2MnO_3$ positive electrode material according to Example 1 has an initial charge/discharge capacity higher than that of the cell using the iron-containing $Li_2MnO_3$ positive electrode material according to Comparative Example 1.

Figure 6:
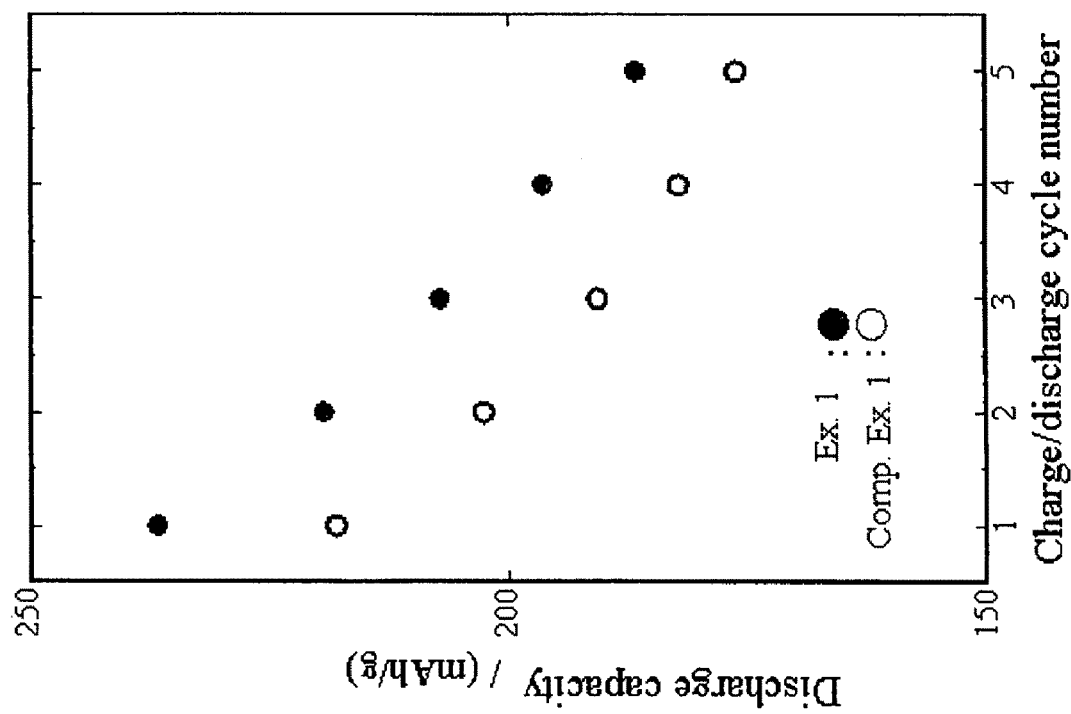
FIG. 6 is a graph illustrating the charge/discharge cycle number dependence of the discharge capacity of coin-type lithium cells each using a sample according to Example 1 or Comparative Example 1 as positive electrode materials.

FIG. 6 is a graph illustrating the charge/discharge cycle number dependence of the discharge capacity for each cell. The results show that the lithium cell using the iron- and titanium-containing positive electrode material according to Example 1 has higher capacity upon every cycle.

The aforementioned results confirmed that the iron- and titanium-containing $Li_2MnO_3$ composite oxide according to the invention exhibits excellent charge/discharge characteristics in the charge/discharge test at a temperature as high as 60° C., thus providing excellent performance as a lithium manganese-based positive electrode material for use in lithium-ion batteries.

Example 2

As in Example 1, a coprecipitate was formed, hydrothermally treated and washed with water. The obtained powder was mixed with an aqueous lithium hydroxide solution of 5.25 g of a lithium hydroxide monohydrate dissolved in 100 mL of distilled water and stirred. The mixture was then dried at 100° C. overnight and pulverized to form a powder.

The powder was then heated in air to 650° C. over 1 hour. After firing at that temperature for 1 minute, the powder was cooled to about room temperature in a furnace, and then the fired product was washed with distilled water to remove excess lithium salts, filtered and dried to obtain the target iron- and titanium-containing $Li_2MnO_3$ as a powdery product.

Figure 7:
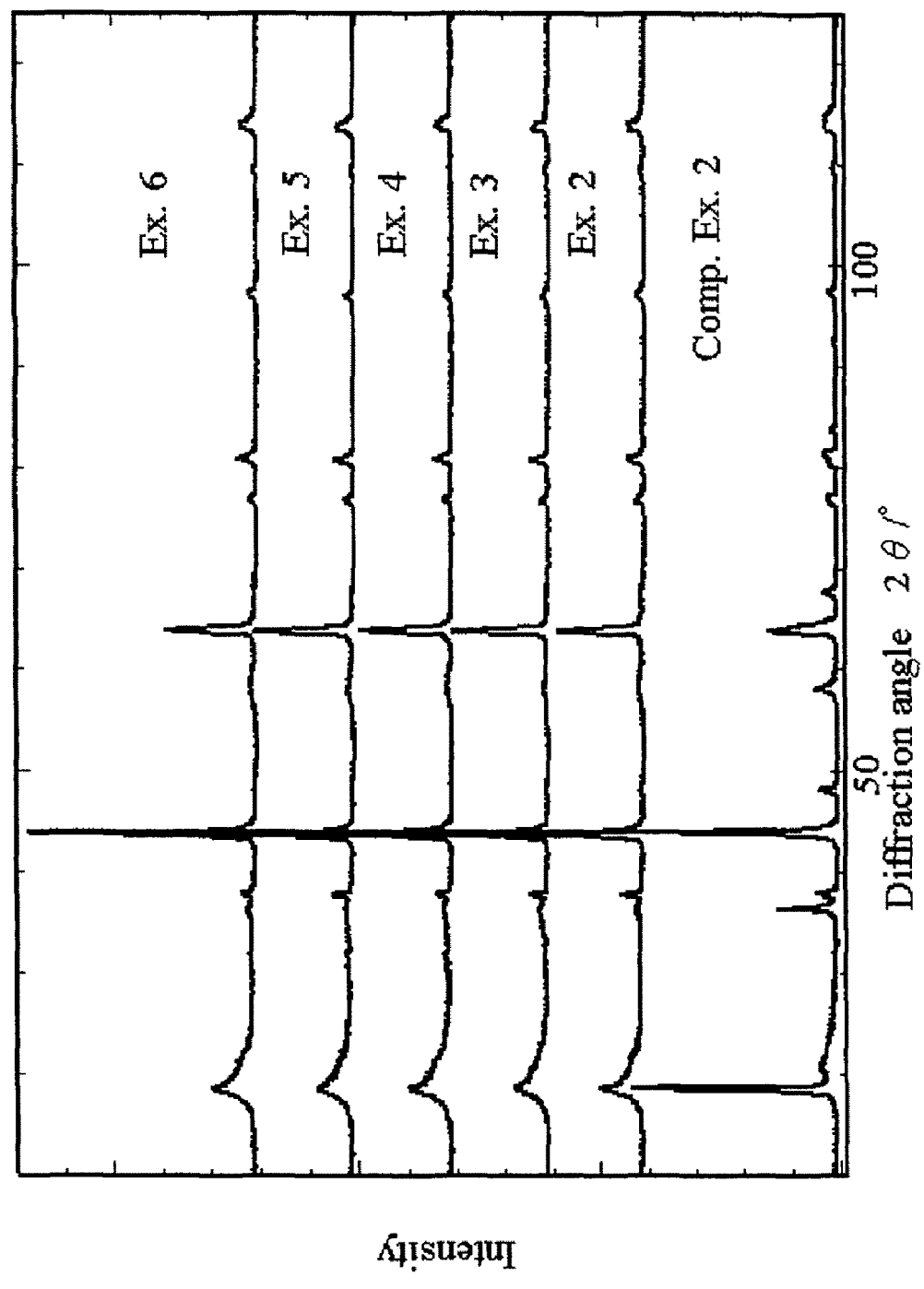
FIG. 7 is a graph showing the X-ray diffraction patterns of samples according to Examples 2 to 6 and Comparative Example 2.

The X-ray diffraction pattern of this product is shown in FIG. 7. According to a Rietveld analysis (using RIETAN-2000), all of the peaks were indexed by a crystal phase with a unit cell (R $\bar{3}$m) of layered rock-salt type iron-containing $Li_2MnO_3$ (first phase: a=2.883(3) Å, c=14.239(9) Å) and a crystal phase with a unit cell (Fm $\bar{3}$ m) of cubic rock-salt type α-$LiFeO_2$ (second phase: a=4.1118(3) Å, the weight ratio of the first and second phases: 20:80).

Chemical analysis (Table 2 below) shows that the Fe and Ti contents are 40 mol % (value m) and 20 mol % (value n), respectively, which are close to the amounts supplied, and that the value x calculated from the value Li/(Mn+Fe+Ti) is 0.18; hence it was confirmed that iron- and titanium-containing $Li_2MnO_3$ ($Li_{1.18}(Fe_{0.40}Mn_{0.40}Ti_{0.20})_{0.82}O_2$) was obtained in Example 2.

Figure 8:
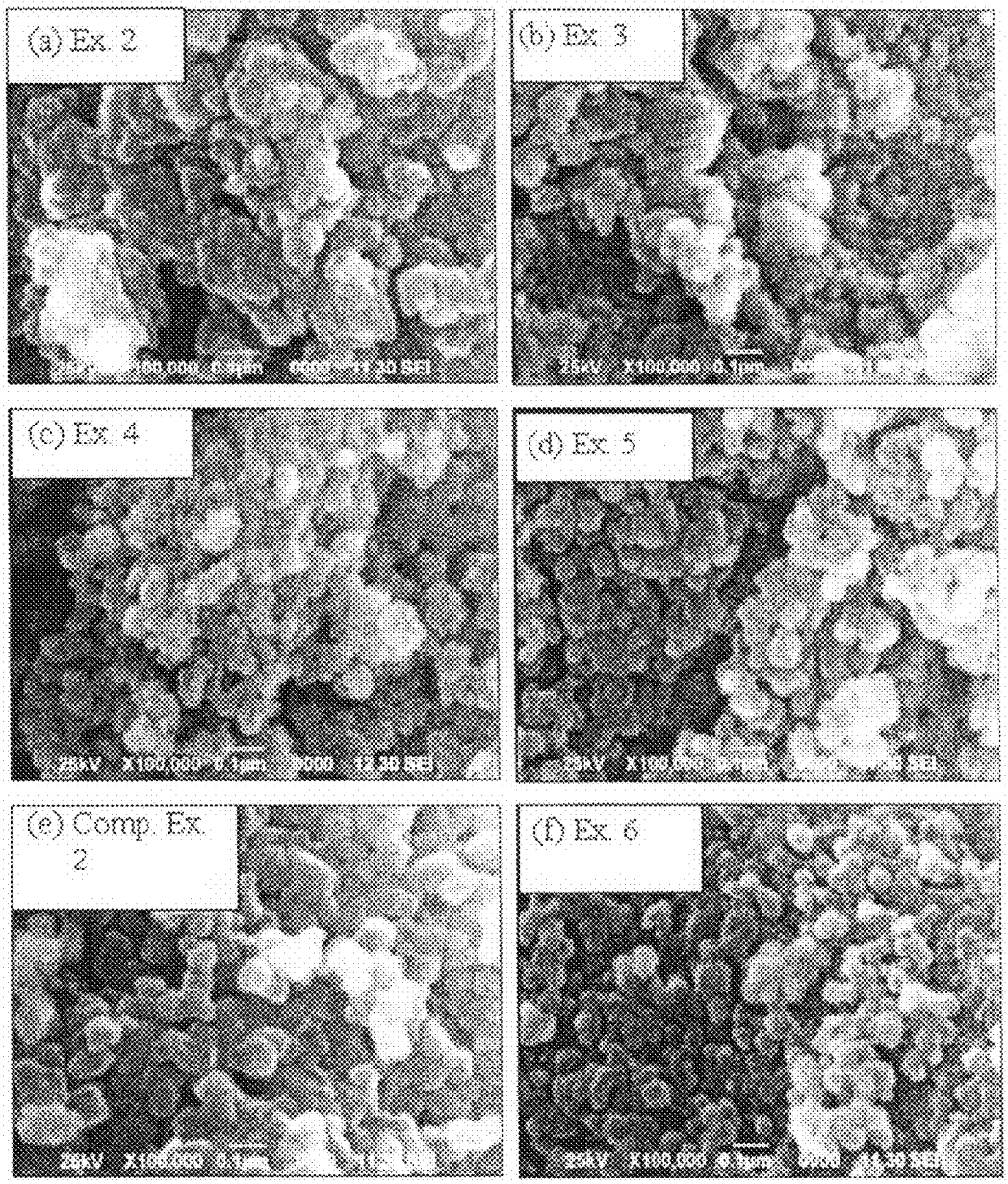
FIGS. 8 (a), (b), (c), (d), (e) and (f) are electronic image-processed electron micrographs of iron- and titanium-containing $Li_2MnO_3$ according to Examples 2 to 6 and iron-containing $Li_2MnO_3$ according to Comparative Example 2.

FIG. 8 (a) shows an electronic image-processed electron micrograph of the iron- and titanium-containing $Li_2MnO_3$ obtained as the final product in Example 2. It is clear from FIG. 8 (a) that the iron- and titanium-containing $Li_2MnO_3$ was formed in accordance with Example 2 composed of agglomerates of particles with a diameter of 100 nm or less. A comparison of this electron micrograph with that of a sample according to Comparative Example 2 below also clarifies that the sample according to Example 2 has a smaller particle diameter. The specific surface area of the sample according to Example 2 is 30.2 $m^2/g$, which is greater than that of the sample according to Comparative Example 2 (21.8 $m^2/g$), establishing that the sample according Example 2 has primary particles smaller than those of the sample according to Comparative Example 2.

Comparative Example 2

A precipitate was formed using an aqueous Fe—Mn solution prepared by adding 50.50 g of an iron (III) nitrate nonahydrate and 24.74 g of a manganese (II) chloride tetrahydrate (total amount: 0.25 mol, Fe:Mn molar ratio: 1:1) to 500 mL of distilled water. The precipitate was then aged, hydrothermally treated, washed with water and filtered to obtain a lithium manganese-based composite oxide. The above procedure was performed under the same conditions as in Comparative Example 1.

The powder thus obtained was then mixed with an aqueous lithium hydroxide solution of 5.25 g of a lithium hydroxide monohydrate dissolved in 100 mL of distilled water, dried at 100° C. and pulverized to form a powdery product. The powder was then heated in air to 850° C. over 1 hour. After firing at that temperature for 1 minute, the powder was cooled to about room temperature in a furnace, and then the fired product was washed with distilled water to remove excess lithium salts, filtered and dried to obtain iron-containing $Li_2MnO_3$ as a powdery product.

The X-ray diffraction pattern of this product is shown in FIG. 7. All of the diffraction peaks were indexed by a crystal phase with a unit cell (R $\overline{3}$ m) of a layered rock-salt type structure (first phase: a=2.8854(3) Å, c=14.2964(14) Å) and a crystal phase with a unit cell (Fm $\overline{3}$ m) of cubic rock-salt type α-LiFeO$_2$ (second phase: a=4.1035(7) Å, the weight ratio of the first and second phases: 58:42). The results confirmed the formation of a lithium-iron-manganese composite oxide comprising a layered rock-salt type crystal phase. The lattice parameters of the layered rock-salt type crystal phase obtained were close to the values reported for an existing lithium-iron-manganese composite oxide (lattice parameters: a=2.882 Å, c=14.287 Å) (M. Tabuchi, A. Nakashima, H. Shigemura, K. Ado, H. Kobayashi, H. Sakaebe, H. Kageyama, T. Nakamura, M. Kohzaki, A. Hirano and R. Kanno; Journal of The Electrochemical Society, 149, A509-A524, 2002).

Chemical analysis (Table 2 below) shows that the Fe content (value m) is 50 mol % as supplied, and the value x calculated from the value Li/(Mn+Fe) is 0.20; hence it was confirmed that the sample obtained in Comparative Example 2 has an average composition of (Li$_{1.20}$(Fe$_{0.5}$Mn$_{0.5}$)$_{0.80}$O$_2$).

The results of chemical analysis shown in Table 2 confirmed that the sample according to Comparative Example 2 had a Li content higher than that of the sample according to Example 2, showing that a lack of Li was prevented by firing at high temperature.

FIG. 8 (e) shows an electronic image-processed electron micrograph of the iron-containing Li$_2$MnO$_3$ obtained as the final product in Comparative Example 2. It is clear from FIG. 8 (e) that the iron-containing Li$_2$MnO$_3$ was formed in accordance with Comparative Example 2 composed of agglomerates of particles with a diameter of 100 nm or less, as in Example 2. It is also clear that the sample according to Comparative Example 2 has a particle diameter greater than that of the sample according to Example 2. The specific surface area of the sample according to Comparative Example 2 is 21.8 m$^2$/g, which is smaller than that of the sample according to Example 2 (30.2 m$^2$/g), establishing that the sample according to Comparative Example 2 is composed of particles greater than those of the sample according to Example 2.

The aforementioned results show that although a lack of Li was prevented in the sample according to Comparative Example 2 by elevating the firing temperature without the addition of titanium sulfate, this resulted in particle growth.

TABLE 2

| | Li/wt % | Fe/wt % | Mn/wt % | Ti/wt % | In the compositional formula Li$_{1+x}$(Mn$_{1-m-n}$Fe$_m$Ti$_n$)$_{1-x}$O$_2$ | | |
|---|---|---|---|---|---|---|---|
| | | | | | value x | value m | value n |
| Ex. 2 | 9.30 | 20.7 | 20.4 | 8.64 | 0.18 | 0.40 | 0.20 |
| Ex. 3 | 9.27 | 18.9 | 18.4 | 13.5 | 0.17 | 0.35 | 0.30 |
| Ex. 4 | 10.0 | 10.4 | 20.2 | 17.5 | 0.22 | 0.20 | 0.40 |
| Ex. 5 | 9.58 | 18.9 | 18.2 | 13.4 | 0.19 | 0.36 | 0.29 |
| Ex. 6 | 9.39 | 20.9 | 20.4 | 8.69 | 0.19 | 0.40 | 0.20 |
| Ex. 7 | 11.2 | — | 25.6 | 21.1 | 0.28 | — | 0.49 |
| Comp. Ex. 2 | 9.82 | 26.5 | 25.6 | — | 0.20 | 0.50 | — |
| Comp. Ex. 3 | 12.0 | — | 46.1 | — | 0.35 | — | — |

Charge/Discharge Test

Coin-type lithium cells were prepared, each using a positive electrode material obtained by dry-blending 20 mg of a composite oxide according to Example 2 or composite oxide according to Comparative Example 2 with 5 mg of acetylene black and 0.5 mg of PTFE powder; a negative electrode material comprising Li metal; an electrolyte of a 1 M solution containing LiPF$_6$ dissolved in a solvent mixture of ethylene carbonate and diethyl carbonate. The charge/discharge characteristics of each lithium cell were studied at 60° C. (voltage range: 2.0-4.5 V, current density: 42.5 mA/g). Each measurement was started from the beginning of charging the cell.

Figure 9:
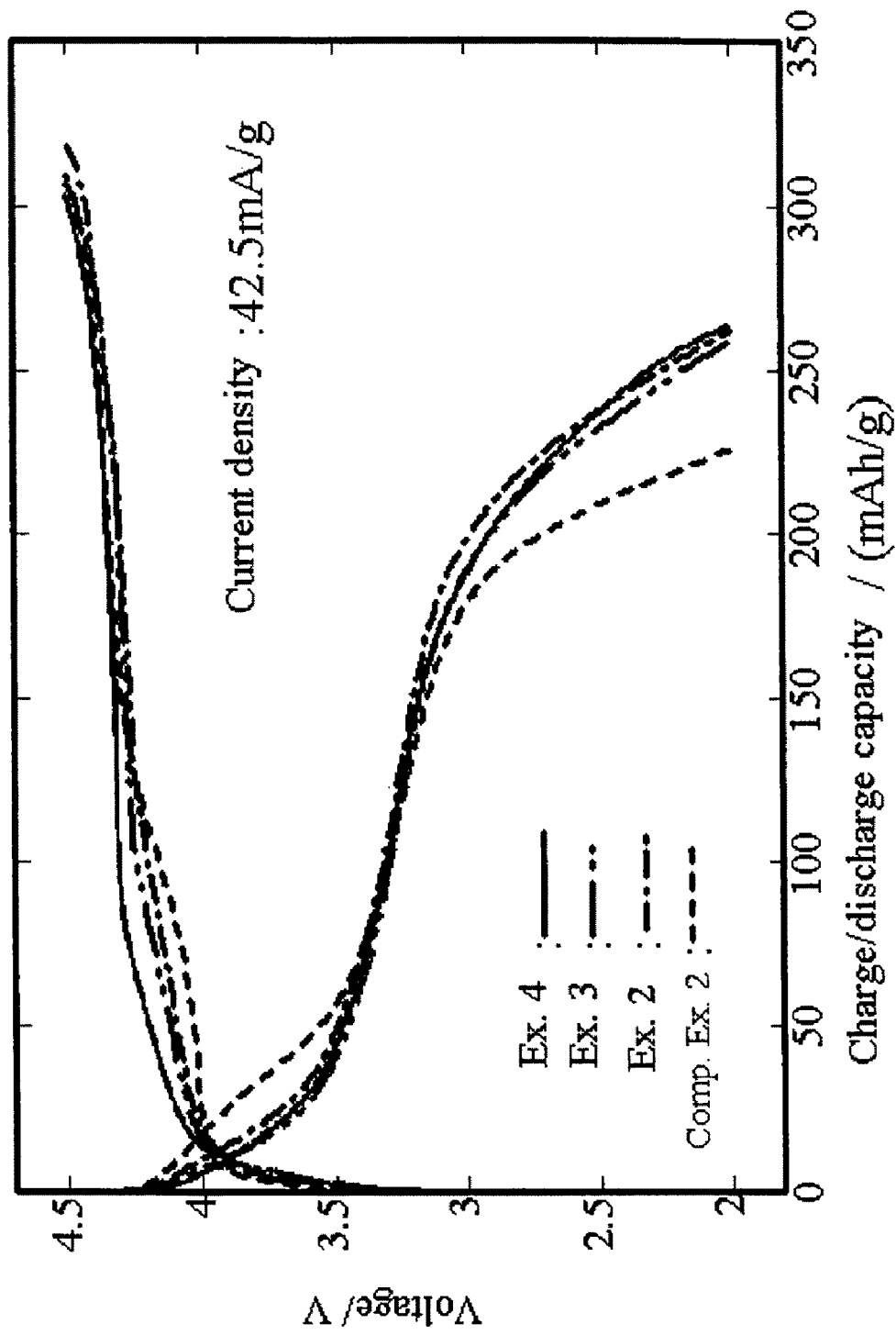
FIG. 9 is a graph showing the initial charge/discharge characteristics of coin-type lithium cells each using a sample according to Examples 2, 3, 4 or Comparative Example 2 as positive electrode materials measured at 60° C. and a current density of 42.5 mA/g between 2.0-4.8 V.

The graph of FIG. 9 shows the charge/discharge characteristics of each type of lithium cell using the positive electrode material according to Example 2 (dashed-dotted line) or Comparative Example 2 (dashed line). In FIG. 9, the upward curves correspond to the charge curves, and the downward curves correspond to the discharge curves. Table 3 below presents the initial charge/discharge data obtained in the test.

TABLE 3

| | Initial charge capacity/ (mAh/g) | Initial discharge capacity/ (mAh/g) | Initial charge/ discharge efficiency*/ % | Average initial discharge voltage/V | energy density during initial discharge**/ (mWh/g) |
|---|---|---|---|---|---|
| Ex. 2 | 318 | 261 | 82 | 3.20 | 836 |
| Ex. 3 | 307 | 258 | 84 | 3.16 | 816 |
| Ex. 4 | 304 | 264 | 87 | 3.15 | 832 |
| Comp. Ex. 2 | 309 | 226 | 73 | 3.27 | 739 |

*The initial charge/discharge efficiency was determined by dividing the initial discharge capacity by the initial charge capacity, and multiplying the result by 100.
**The energy density during initial discharge corresponds to the product of the initial discharge capacity and the average initial voltage.

It is clear from FIG. 9 and Table 3 that the cell using the iron- and titanium-containing Li$_2$MnO$_3$ positive electrode material according to Example 2, compared to the cell using the iron-containing Li$_2$MnO$_3$ according to Comparative Example 2, exhibits a higher discharge capacity (261 mAh/g), a higher energy density (836 mWh/g) and improved charge/discharge reversibility (82%), while having a substantially equal charge capacity.

The aforementioned results confirmed that the iron- and titanium-containing Li$_2$MnO$_3$ composite oxide according to the invention exhibits excellent charge/discharge characteristics in the charge/discharge test at a temperature as high as 60° C., thus providing excellent performance as a lithium manganese-based positive electrode material for use in lithium-ion batteries.

Example 3

To 500 mL of distilled water was added 35.35 g of an iron (III) nitrate nonahydrate, 17.32 g of a manganese (II) chloride tetrahydrate, and 60.00 g of a 30% aqueous titanium sulfate solution (total amount: 0.25 mol, Fe:Mn:Ti molar ratio: 0.7:0.7:0.6), and thoroughly dissolved. An aqueous lithium hydroxide solution (a solution of 50 g of a lithium hydroxide monohydrate dissolved in 500 mL of distilled water) was prepared in a separate beaker. After pouring this aqueous lithium hydroxide solution into a titanium beaker, 200 mL of ethanol was added and stirred. The lithium hydroxide solution was then allowed to stand in a thermostat at a constant temperature of −10° C. The aqueous solution of metal salts obtained above was then added dropwise into this aqueous lithium hydroxide solution over 2 to 3 hours, thus forming a Fe—Mn—Ti precipitate. After confirming that the solution had been made completely alkaline (a pH of 11 or more), the solution containing the coprecipitate was oxidized while stirring by bubbling air through the solution at room temperature for 2 days, to age the precipitate.

The resulting precipitate was washed with distilled water and filtered. The precipitate product was then placed into a polytetrafluoroethylene beaker along with 50 g of a lithium hydroxide monohydrate, 50 g of potassium chlorate, 309 g of potassium hydroxide and 600 mL of distilled water and stirred well. The mixture had a pH of 11 or more. The mixture was then placed in a hydrothermal reactor (autoclave) and hydrothermally treated at 220° C. for 5 hours.

After the completion of the hydrothermal treatment, the reactor was cooled to about room temperature, and the beaker containing the hydrothermally reacted solution was taken out from the autoclave. The formed precipitate was washed with distilled water to remove salts such as excess lithium hydroxide and filtered to obtain a powdery product (lithium manganese-based composite oxide).

The filtered powder was mixed with an aqueous lithium hydroxide solution of 2.10 g of a lithium hydroxide monohydrate dissolved in 100 mL of distilled water and stirred. The mixture was then dried at 100° C. overnight and pulverized to form a powder.

The powder was then heated in air to 450° C. over 1 hour. After firing at that temperature for 1 minute, the powder was cooled to about room temperature in a furnace, and then the fired product was washed with distilled water to remove excess lithium salts, filtered and dried to obtain the target iron- and titanium-containing $Li_2MnO_3$ as a powdery product.

The X-ray diffraction pattern of this product is shown in FIG. 7. According to a Rietveld analysis (using RIETAN-2000), all of the peaks were indexed by a crystal phase with a unit cell (R $\bar{3}$ m) of layered rock-salt type iron-containing $Li_2MnO_3$ (first phase: a=2.899(4) Å, c=14.195(13) Å) and a crystal phase with a unit cell (Fm $\bar{3}$ m) of cubic rock-salt type α-$LiFeO_2$ (second phase: a=4.1137(3) Å, the weight ratio of the first and second phases: 24:76).

Chemical analysis (Table 2 below) shows that the Fe and Ti contents are 35 mol % (value m) and 30 mol % (value n), respectively, which are close to the amounts supplied, and that the value x calculated from the value Li/(Mn+Fe+Ti) is 0.17; hence it was confirmed that iron- and titanium-containing $Li_2MnO_3$ ($Li_{1.17}(Fe_{0.35}Mn_{0.35}Ti_{0.30})_{0.83}O_2$) was obtained in Example 3.

FIG. 8 (b) shows an electronic image-processed electron micrograph of the iron- and titanium-containing $Li_2MnO_3$ obtained as the final product in Example 3. It is clear from FIG. 8 (b) that the iron- and titanium-containing $Li_2MnO_3$ was formed in accordance with Example 3 composed of agglomerates of particles with a diameter of 100 nm or less. It is also clear that the sample according to Example 3 has a particle diameter smaller than that of the sample according to Comparative Example 2. The specific surface area of the sample according to Example 3 is 40.9 $m^2/g$, which is greater than that of the sample according to Comparative Example 2 (21.8 $m^2/g$), establishing that the sample according to Example 3 is composed of particles smaller than those of the sample according to Comparative Example 2.

Charge/Discharge Test

Coin-type lithium cells were prepared, each using a positive electrode material obtained by dry-blending 20 mg of a composite oxide according to Example 3 or composite oxide according to Comparative Example 2 with mg of acetylene black and 0.5 mg of PTFE powder; a negative electrode material comprising Li metal; an electrolyte of a 1 M solution containing $LiPF_6$ dissolved in a solvent mixture of ethylene carbonate and diethyl carbonate. The charge/discharge characteristics of each lithium cell were studied at 60° C. (voltage range: 2.0-4.5 V, current density: 42.5 mA/g). Each measurement was started from the beginning of charging the cell.

The graph of FIG. 9 shows the initial charge/discharge characteristics of the lithium cell using the positive electrode material according to Example 3 (dashed double-dotted line). Table 3 above presents the initial charge/discharge data obtained in the charge/discharge test. It is clear from FIG. 9 and Table 3 that the cell using the iron- and titanium-containing $Li_2MnO_3$ positive electrode material according to Example 3, compared to the cell using the iron-containing $Li_2MnO_3$ according to Comparative Example 2, exhibits a higher discharge capacity (258 mAh/g), a higher energy density (816 mWh/g) and improved charge/discharge reversibility (84%), while having a substantially equal charge capacity.

The aforementioned results confirmed that the iron- and titanium-containing $Li_2MnO_3$ composite oxide according to the invention exhibits excellent charge/discharge characteristics in the charge/discharge test at a temperature as high as 60° C., thus providing excellent performance as a lithium manganese-based positive electrode material for use in lithium-ion batteries.

Example 4

To 500 mL of distilled water was added 20.20 g of an iron (III) nitrate nonahydrate, 19.79 g of a manganese (II) chloride tetrahydrate and 80.00 g of a 30% aqueous titanium sulfate solution (total amount: 0.25 mol, Fe:Mn:Ti molar ratio: 1:2:2), and thoroughly dissolved. An aqueous lithium hydroxide solution (a solution of 50 g of a lithium hydroxide monohydrate dissolved in 500 mL of distilled water) was prepared in a separate beaker. After pouring this aqueous lithium hydroxide solution into a titanium beaker, 200 mL of ethanol was added and stirred. The lithium hydroxide solution was then allowed to stand in a thermostat at a constant temperature of −10° C. The aqueous solution of metal salts obtained above was then added dropwise into the aqueous lithium hydroxide solution over a period of 2 to 3 hours, thus forming a Fe—Mn—Ti precipitate. After confirming that the solution had been made completely alkaline (a pH of 11 or more), the solution containing the coprecipitate was oxidized while stirring by bubbling air through the solution at room temperature for 2 days, to age the precipitate.

The resulting precipitate was washed with distilled water and filtered. The precipitate product was then placed into a polytetrafluoroethylene beaker along with 50 g of a lithium hydroxide monohydrate, 50 g of potassium chlorate, 309 g of potassium hydroxide and 600 mL of distilled water and stirred well. The mixture had a pH of 11 or more. The mixture was then placed in a hydrothermal reactor (autoclave) and hydrothermally treated at 220° C. for 5 hours.

After the completion of the hydrothermal treatment, the reactor was cooled to about room temperature, and the beaker containing the hydrothermally reacted solution was taken out from the autoclave. The formed precipitate was washed with distilled water to remove salts such as excess lithium hydroxide and filtered to obtain a powdery product (lithium manganese-based composite oxide).

The filtered powder was mixed with an aqueous lithium hydroxide solution of 5.25 g of a lithium hydroxide monohydrate dissolved in 100 mL of distilled water and stirred. The lithium hydroxide solution was then dried at 100° C. overnight and pulverized to form a powder.

The powder was then heated in air to 500° C. over 1 hour. After firing at that temperature for 1 minute, the powder was cooled to about room temperature in a furnace, and then the fired product was washed with distilled water to remove excess lithium salts, filtered and dried to obtain the target iron- and titanium-containing $Li_2MnO_3$ as a powdery product.

The X-ray diffraction pattern of this product is shown in FIG. 7. According to a Rietveld analysis (using RIETAN-2000), all of the peaks were indexed by a crystal phase with a unit cell (R $\bar{3}$ m) of layered rock-salt type iron-containing $Li_2MnO_3$ (first phase: a=2.883(3) A, c=14.231(11) Å) and a crystal phase with a unit cell (Fm $\bar{3}$ m) of cubic rock-salt type α-$LiFeO_2$ (second phase: a=4.1101(3) A, the weight ratio of the first and second phases: 19:81).

Chemical analysis (Table 2 above) shows that the Fe and Ti contents are 20 mol % (value m) and 40 mol % (value n), respectively, which are close to the amounts supplied, and that the value x calculated from the value Li/(Mn+Fe+Ti) is 0.22; hence it was confirmed that iron- and titanium-containing $Li_2MnO_3$ ($Li_{1.22}(Fe_{0.20}Mn_{0.40}Ti_{0.40})_{0.78}O_2$) was obtained in Example 4. Moreover, with x being greater than that in Comparative Example 2, it was found that a lack of Li was prevented by the presence of Ti.

FIG. 8 (c) shows an electronic image-processed electron micrograph of the iron- and titanium-containing $Li_2MnO_3$ obtained as the final product in Example 4. It is clear from FIG. 8 (c) that the iron- and titanium-containing $Li_2MnO_3$ was formed in accordance with Example 4 composed of agglomerates of particles with a diameter of 100 nm or less. It is also clear that the sample according to Example 4 has a particle diameter smaller than that of the sample according to Comparative Example 2. The specific surface area of the sample according to Example 4 is 44.4 $m^2$/g, which is greater than that of the sample according to Comparative Example 2 (21.8 $m^2$/g), establishing that the sample according to Example 4 is composed of particles smaller than those of the sample according to Comparative Example 2.

Charge/Discharge Test

Coin-type lithium cells were prepared, each using a positive electrode material obtained by dry-blending 20 mg of a composite oxide according to Example 4 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 60° C. (voltage range: 2.0-4.5 V, current density: 42.5 mA/g). Each measurement was started from the beginning of charging the cell.

The graph of FIG. 9 shows the charge/discharge characteristics of the lithium cell using the positive electrode material according to Example 4 (solid line). Table 3 above presents the charge/discharge data obtained in the charge/discharge test. It is clear from FIG. 9 and Table 3 that the cell using the iron- and titanium-containing $Li_2MnO_3$ positive electrode material according to Example 4, compared to the cell using the iron-containing $Li_2MnO_3$ according to Comparative Example 2, exhibits a higher discharge capacity (264 mAh/g), a higher energy density (832 mWh/g) and improved charge/discharge reversibility (87%), while having a substantially equal charge capacity.

Figure 10:
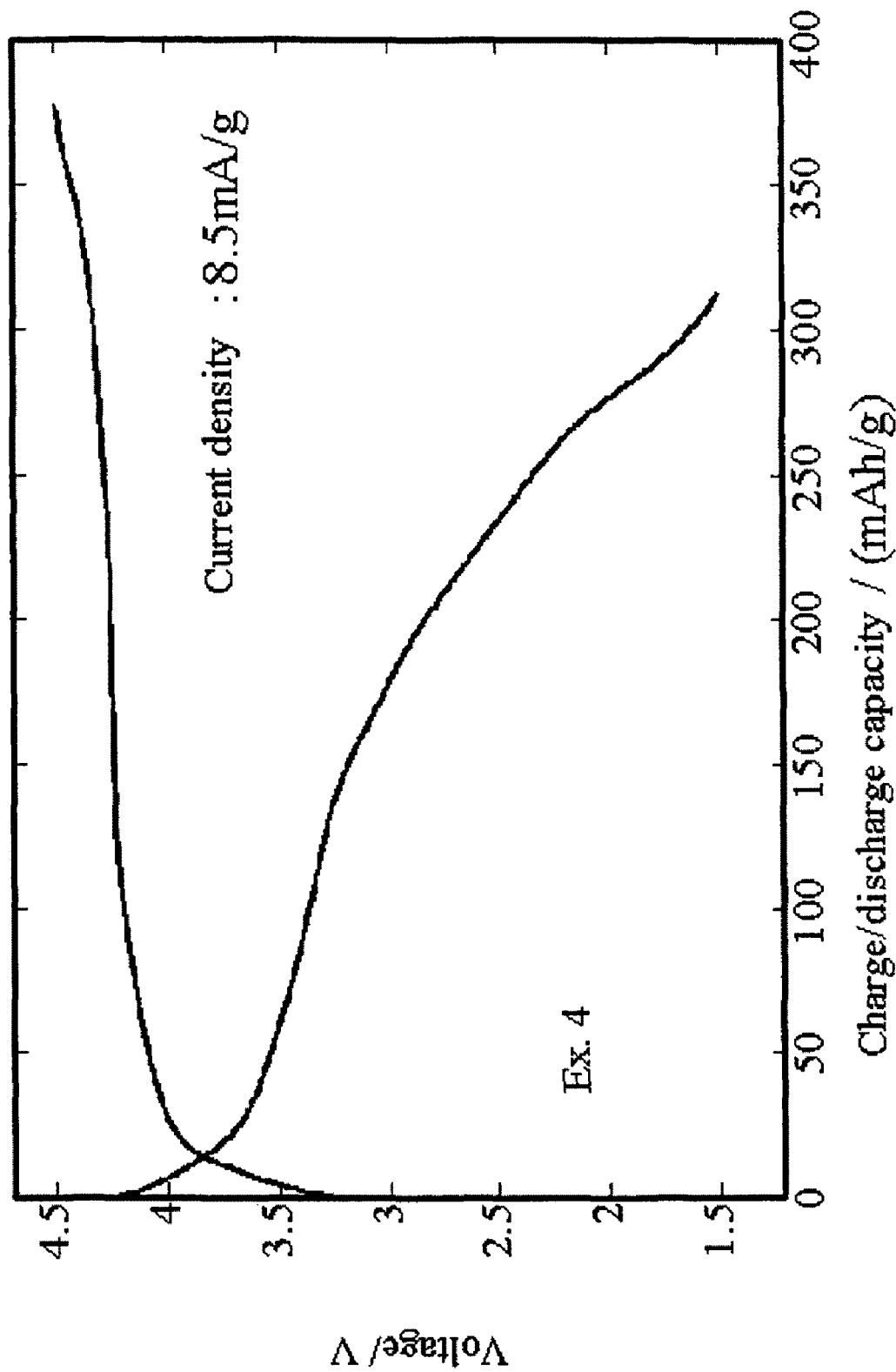
FIG. 10 is a graph illustrating the initial charge/discharge characteristics of a coin-type lithium cell using a sample according to Example 4 as a positive electrode material measured at 60° C. and a current density of 8.5 mA/g between 1.5-4.8 V.

In addition, a coin-type lithium cell was prepared using a positive electrode material obtained by dry-blending 20 mg of a composite oxide according to Example 4 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and diethyl carbonate. The charge/discharge characteristics of this lithium cell were studied at 60° C. (voltage range: 1.5-4.5 V, current density: 8.5 mA/g). The measurement was started from the beginning of charging the cell. FIG. 10 is a graph illustrating the charge/discharge characteristics obtained in this test. Table 4 below presents the charge/discharge data obtained in this test.

TABLE 4

| | Initial charge capacity/ (mAh/g) | Initial discharge capacity/ (mAh/g) | Initial charge/ discharge efficiency*/% | Average initial discharge voltage/V | energy density during initial discharge**/ (mWh/g) |
|---|---|---|---|---|---|
| Ex. 4 | 377 | 313 | 83 | 2.95 | 924 |

*The initial charge/discharge efficiency was determined by dividing the initial discharge capacity divided by the initial charge capacity, and multiplying the result by 100.
**The energy density during initial discharge corresponds to the product of the initial discharge capacity and the average initial voltage.

As shown in FIG. 10 and Table 4, the initial charge/discharge capacity further increased by decreasing the current density and reducing the lower voltage limit to 1.5 V, resulting in a charge/discharge capacity as high as 377 mAh/g during charge and 313 mAh/g during discharge. The energy density also increased to 924 mWh/g.

Accordingly, the iron- and titanium-containing $Li_2MnO_2$ composite oxide of the invention exhibits a very high capacity because of its Li content higher than that of general $LiCoO_2$ oxides and gradually decreasing shape of the discharge curve.

The aforementioned results confirmed that the iron- and titanium-containing $Li_2MnO_3$ composite oxide according to the invention exhibits excellent charge/discharge characteristics in the charge/discharge test at a temperature as high as 60° C., thus providing excellent performance as a lithium manganese-based positive electrode material for use in lithium-ion batteries.

Coin-type lithium cells were prepared, using a positive electrode material obtained by dry-blending 20 mg of a composite oxide according to Example 4 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and diethyl carbonate. The charge/discharge characteristics of each type of lithium cell were studied at 30° C. (voltage range: 2.0-4.8 V, current density: 42.5 mA/g). Each measurement was started from the beginning of charging each cell. The temperature during discharging was also varied to 0 and −20° C., in addition to 30° C. As to the discharge test at −20° C., the evaluation was also performed at a reduced current density of 8.5 mA/g. Prior to the discharge test at each temperature, each lithium cell was charged, discharged and then charged at 30° C. and the same current density as in the test.

Figure 11:
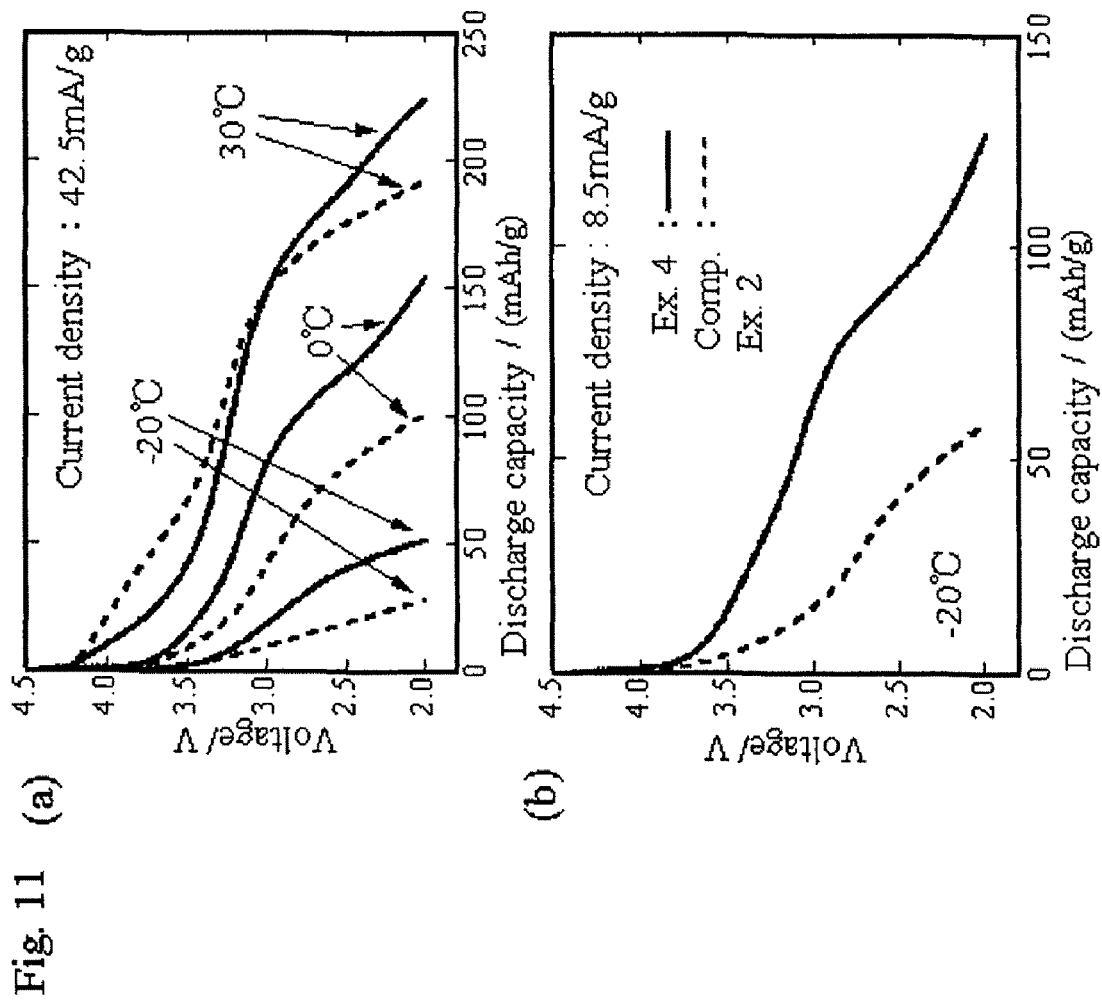
FIG. 11 (a) is a graph illustrating the initial discharge characteristics of coin-type lithium cells each using a sample according to Example 4 or Comparative Example 2 as positive electrode materials which were measured at 30, 0 and −20° C. and a current density of 42.5 mA/g after charging to 4.8 V at 30° C.

FIGS. 11 (a) and (b) are graphs illustrating the discharge characteristics of each type of lithium cell using the positive electrode material according to Example 4 (solid line) or Comparative Example 2 (dashed line) at the three different temperatures (30, 0 and −20° C.) after being charged to 4.8 V at 30° C. Table 5 below presents the charge/discharge data obtained in this test.

TABLE 5

|  | Discharge capacity/ (mAh/g) at 30° C. and a current density of 42.5 mA/g | Discharge capacity/ (mAh/g) at 0° C. and a current density of 42.5 mA/g | Discharge capacity/ (mAh/g) at −20° C. and a current density of 42.5 mA/g | Discharge capacity/ (mAh/g) at −20° C. and a current density of 8.5 mA/g |
|---|---|---|---|---|
| Ex. 4 | 223 | 153 | 51 | 126 |
| Comp. Ex. 2 | 193 | 101 | 28 | 59 |

It is clear from FIG. 11 and Table 5 that the cell using the iron- and titanium-containing $Li_2MnO_3$ positive electrode material according to Example 4 exhibits, at every temperature, a discharge capacity higher than that of the cell using the iron-containing $Li_2MnO_3$ positive electrode material according to Comparative Example 2.

Furthermore, coin-type lithium cells were prepared, using a positive electrode material obtained by dry-blending 20 mg of a composite oxide according to Example 4 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 30° C. in the voltage range of 2.0-4.8 V. Each measurement was started from the beginning of charging the cell. In addition, with 1 C being defined as a current density of 127.5 mA/g, the charge/discharge characteristics of each type of lithium cell were evaluated at varying discharge current densities of 42.5 mA/g (⅓ C), 127.5 mA/g (1 C), 255 mA/g (2 C), 382.5 mA/g (3 C), 637.5 mA/g (5 C) and 1275 mA/g (10 C). For each test, the cell was charged to 4.8 V at a fixed current density of ⅓ C (42.5 mA/g). Prior to the discharge test at each current density, each lithium cell was charged, discharged and then charged at 30° C. and the fixed current density of 42.5 mA/g.

Figure 12:
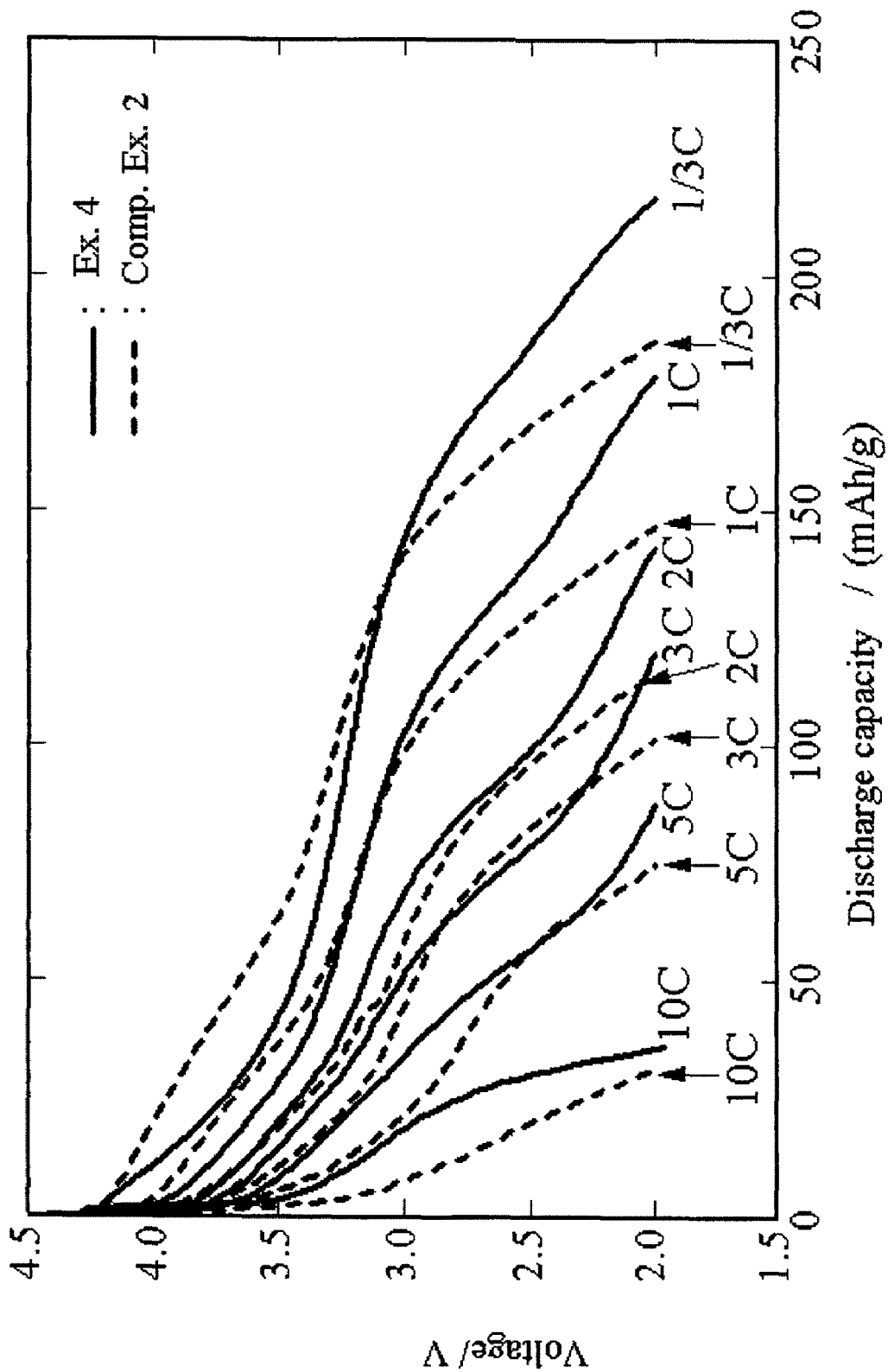
FIG. 12 is a graph illustrating the initial discharge characteristics of coin-type lithium cells each using a sample according to Example 4 or Comparative Example 2 as positive electrode materials which were measured by charging to 4.8 V at 30° C. and 42.5 mA/g, and then discharging to 2.0 V at current densities varied to a maximum of 10 C.

FIG. 12 is a graph illustrating the discharge characteristics of each type of lithium cell using the positive electrode material according to Example 4 (solid line) or Comparative Example 2 (dashed line) at the aforementioned six different current densities after being charged to 4.8 V at 30° C. Table 6 below presents the discharge capacity values obtained in this test.

TABLE 6

|  | Discharge capacity (⅓ C)/ (mAh/g) | Discharge capacity (1 C)/ (mAh/g) | Discharge capacity (2 C)/ (mAh/g) | Discharge capacity (3 C)/ (mAh/g) | Discharge capacity (5 C)/ (mAh/g) | Discharge capacity (10 C)/ (mAh/g) |
|---|---|---|---|---|---|---|
| Ex. 4 | 216 | 179 | 142 | 120 | 88 | 36 |
| Comp. Ex. 2 | 186 | 147 | 116 | 102 | 75 | 31 |

A current density of 127.5 mA/g is defined as 1 C.

It is clear from FIG. 12 and Table 6 that the cell using the iron- and titanium-containing $Li_2MnO_3$ positive electrode material according to Example 4 exhibits, at every current density, a discharge capacity higher than that of the cell using the iron-containing $Li_2MnO_3$ positive electrode material according to Comparative Example 2.

Moreover, for evaluation of the discharge characteristics at current densities as high as 20 C or more, coin-type lithium cells using the positive electrode material according to Example 4 or Comparative Example 2 were prepared in the same manner as described above, except that the amount of the positive electrode active material was reduced to 5 mg from 20 mg. The charge/discharge characteristics of each type of lithium cell were studied at 30° C. in the voltage range of 2.0 to 4.8 V. Each measurement was started from the beginning of charging the cell. In addition, with 1 C being defined as a current density of 127.5 mA/g, the charge/discharge characteristics of each type of lithium cell were evaluated at varying discharge current densities of 2550 mA/g (20 C), 3825 mA/g (30 C) and 7650 mA/g (60 C). For each test, the cell was charged to 4.8 V at a fixed current density of ⅓ C (42.5 mA/g). Prior to the discharge test at each current density, each lithium cell was charged, discharged and then charged at 30° C. and the fixed current density of 42.5 mA/g.

Figure 13:
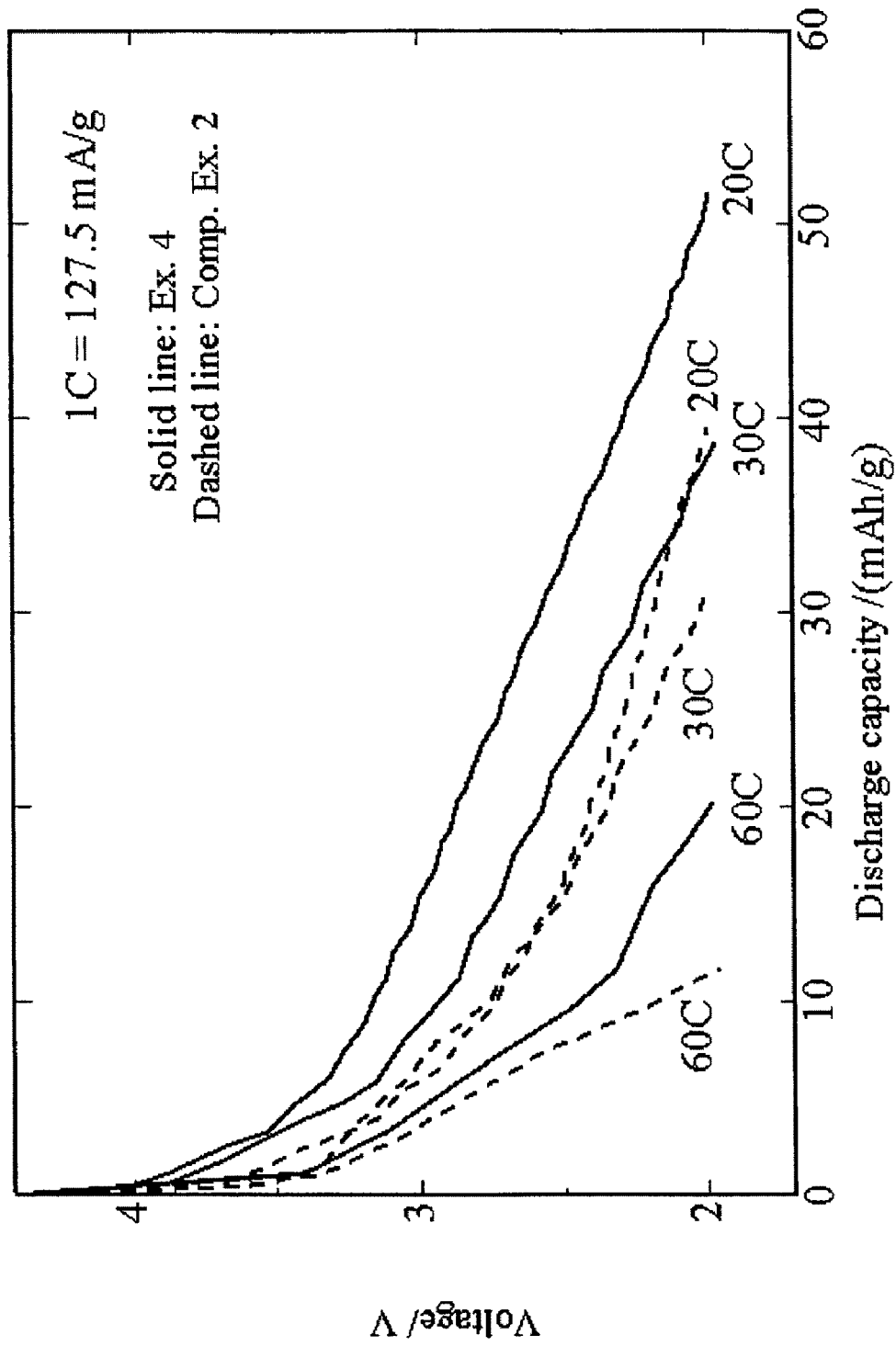
FIG. 13 is a graph illustrating the initial discharge characteristics of coin-type lithium cells each using a sample according to Example 4 or Comparative Example 2 as positive electrode materials which were measured by charging to 4.8 V at 30° C. and 42.5 mA/g, and then discharging to 2.0 V at varying current densities of 20, 30 and 60 C.

FIG. 13 is a graph illustrating the discharge characteristics of each type of lithium cell using the positive electrode material according to Example 4 (solid line) or Comparative Example 2 (dashed line) at the three different current densities after being charged to 4.8 V at 30° C. Table 7 below presents the discharge capacity values obtained in this test.

TABLE 7

|  | Discharge capacity (20 C)/ (mAh/g) | Discharge capacity (30 C)/ (mAh/g) | Discharge capacity (60 C)/ (mAh/g) |
|---|---|---|---|
| Ex. 4 | 52 | 39 | 20 |
| Comp. Ex. 2 | 39 | 31 | 12 |

A current density of 127.5 mA/g is defined as 1 C.

It is clear from FIG. 13 and Table 7 that the cell using the iron- and titanium-containing $Li_2MnO_3$ positive electrode material according to Example 4, compared to the cell using the iron-containing positive electrode material according to Comparative Example 2, has less voltage reduction even at current densities as high as 20 C or more, and shows high discharge capacity.

The aforementioned results confirmed that the iron- and titanium-containing $Li_2MnO_3$ composite oxide of the invention exhibits excellent discharge characteristics, not only at a temperature as high as 60° C. but also at increased current densities at 30° C. or at low temperatures, thus having excellent performance as a lithium manganese-based positive electrode material for use in lithium-ion batteries.

Example 5

A coprecipitate was formed, hydrothermally treated and washed with water under the same conditions as in Example 3.

The powder obtained by filtering was mixed with an aqueous lithium hydroxide containing 5.25 g of a lithium hydroxide monoxide dissolved in 100 mL of distilled water and stirred. The mixture was then dried at 100° C. overnight and pulverized to form a powder.

The powder was then heated in air to 550° C. over 1 hour. After firing at that temperature for 1 minute, the powder was cooled to about room temperature in a furnace. The fired product was then washed with distilled water to remove excess lithium salts, filtered and dried to obtain the target iron- and titanium-containing $Li_2MnO_3$ as a powdery product.

The X-ray diffraction pattern of this product is shown in FIG. 7. According to a Rietveld analysis (using RIETAN-2000), all of the peaks were indexed by a crystal phase with a unit cell (R $\bar{3}$ m) of layered rock-salt type iron-containing $Li_2MnO_3$ (first phase: a=2.892(4) Å, c=14.212(12) Å) and a crystal phase with a unit cell (Fm $\bar{3}$ m) of cubic rock-salt type α-$LiFeO_2$ (second phase: a=4.1150(3) Å, the weight ratio of the first and second phases: 19:81).

Chemical analysis (Table 2 above) shows that the Fe and Ti contents are 36 mol % (value m) and 29 mol % (value n), respectively, which are close to the amounts supplied, and that the value x calculated from the value Li/(Mn+Fe+Ti) is 0.19; hence it was confirmed that iron- and titanium-containing $Li_2MnO_3$ ($Li_{1.19}(Fe_{0.36}Mn_{0.35}Ti_{0.29})_{0.81}O_2$) was obtained in Example 5.

FIG. 8 (d) shows an electronic image-processed electron micrograph of the iron- and titanium-containing $Li_2MnO_3$ obtained as the final product in Example 5. It is clear from FIG. 8 (d) that the iron- and titanium-containing $Li_2MnO_3$ was formed in accordance with Example 5 composed of agglomerates of particles with a diameter of 100 nm or less. It is also clear that the sample according to Example 5 has a particle diameter smaller than that of the sample according to Comparative Example 2. The specific surface area of the sample according to Example 5 is 38.8 $m^2$/g, which is greater than that of the sample according to Comparative Example 2 (21.8 $m^2$/g), establishing that the sample according to Example 5 is composed of particles smaller than those of the sample according to Comparative Example 2.

Charge/Discharge Test

Coin-type lithium cells were prepared, each using a positive electrode material obtained by dry-blending 20 mg of a composite oxide according to Example 5 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 30° C. (voltage range: 2.0-4.8 V, current density: 42.5 mA/g). The temperature during discharging was also varied to 0 and −20° C., in addition to 30° C. As to the discharge test at −20° C., the evaluation was performed at a reduced current density of 8.5 mA/g. Prior to the discharge test at each temperature, each lithium cell was charged, discharged and then charged at 30° C. and the same current density as in the test.

Figure 14:
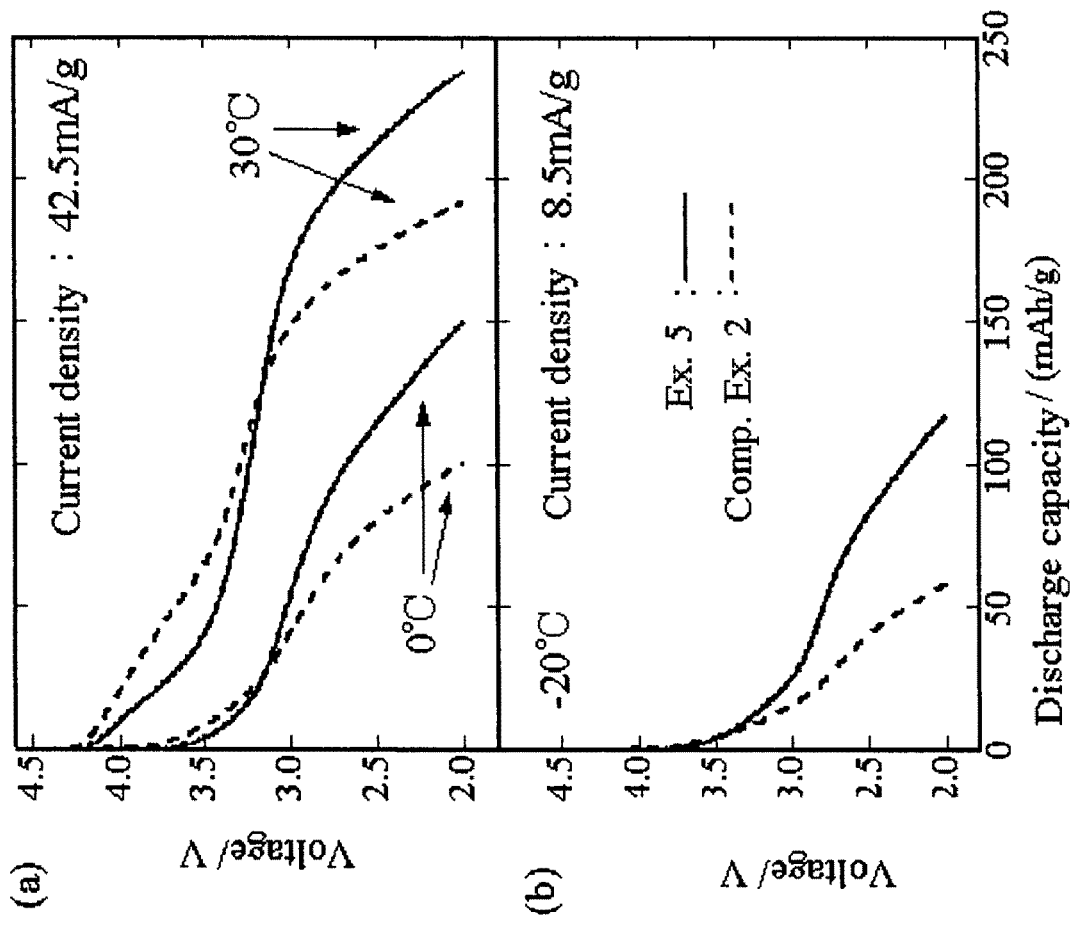
FIG. 14 (a) is a graph illustrating the initial discharge characteristics of coin-type lithium cells each using a sample according to Example 5 or Comparative Example 2 as positive electrode materials which were measured at temperatures of 30 and 0° C. after charging to 4.8 V at 30° C.

FIGS. 14 (a) and 14 (b) are graphs illustrating the discharge characteristics of each type of lithium cell using the positive electrode material according to Example 5 (solid line) or Comparative Example 2 (dashed line) at the three different temperatures after being charged to 4.8 V at 30° C. Table 8 below presents the charge/discharge data obtained in this test.

TABLE 8

| | Discharge capacity/ (mAh/g) at 30° C. and a current density of 42.5 mA/g | Discharge capacity/ (mAh/g) at 0° C. and a current density of 42.5 mA/g | Discharge capacity/ (mAh/g) at −20° C. and a current density of 8.5 mA/g |
|---|---|---|---|
| Ex. 5 | 238 | 150 | 117 |
| Comp. Ex. 2 | 193 | 101 | 59 |

It is clear from FIG. 14 and Table 8 that the cell using the iron- and titanium-containing $Li_2MnO_3$ positive electrode material according to Example 5 has, at every temperature, a discharge capacity higher than that of the cell using the iron-containing positive electrode material according to Comparative Example 2.

The aforementioned results confirmed that the iron- and titanium-containing $Li_2MnO_3$ composite oxide of the invention exhibits excellent discharge characteristics, not only at 30° C. but also at a temperature as low as −20° C., thus having excellent performance as a lithium manganese-based positive electrode material for use in lithium-ion batteries.

Example 6

As in Example 1, a coprecipitate was formed, hydrothermally treated and washed with water under the same conditions.

The powder obtained by filtering was mixed with an aqueous lithium hydroxide containing 5.25 g of a lithium hydroxide monoxide dissolved in 100 mL of distilled water and stirred. The mixture was then dried at 100° C. overnight and pulverized to form a powder.

The powder was then heated in air to 600° C. over 1 hour. After firing at that temperature for 1 minute, the powder was cooled to about room temperature in a furnace. The fired product was then washed with distilled water to remove excess lithium salts, filtered and dried to obtain the target iron- and titanium-containing $Li_2MnO_3$ as a powdery product.

The X-ray diffraction pattern of this product is shown in FIG. 7. According to a Rietveld analysis (using RIETAN-2000), all of the peaks were indexed by a crystal phase with a unit cell (R $\bar{3}$ m) of layered rock-salt type iron-containing $Li_2MnO_3$ (first phase: a=2.885(4) Å, c=14.204(11) Å) and a crystal phase with a unit cell (Fm $\bar{3}$ m) of cubic rock-salt type α-$LiFeO_2$ (second phase: a=4.1098(3) Å, the weight ratio of the first and second phases: 18:82).

Chemical analysis (Table 2 above) shows that the Fe and Ti contents are 40 mol % (value m) and 20 mol % (value n), respectively, which are close to the amounts supplied, and that the value x calculated from the value Li/(Mn+Fe+Ti) is 0.19; hence it was confirmed that iron- and titanium-containing $Li_2MnO_3$ ($Li_{1.19}(Fe_{0.40}Mn_{0.40}Ti_{0.20})_{0.81}O_2$) was obtained in Example 6.

FIG. 8 (f) shows an electronic image-processed electron micrograph of the iron- and titanium-containing $Li_2MnO_3$ obtained as the final product in Example 6. It is clear from FIG. 8 (f) that the iron- and titanium-containing $Li_2MnO_3$ was formed in accordance with Example 6 composed of agglomerates of particles with a diameter of 100 nm or less. It is also clear that the sample according to Example 6 has a particle diameter smaller than that of the sample according to Comparative Example 2. The specific surface area of the sample according to Example 6 is 30.9 $m^2$/g, which is greater than that of the sample according to Comparative Example 2 (21.8 $m^2$/g), establishing that the sample according to Example 6 is composed of particles smaller than those of the sample according to Comparative Example 2.

Charge/Discharge Test

Coin-type lithium cells were prepared, each using a positive electrode material obtained by dry-blending 20 mg of a composite oxide according to Example 6 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 30°

C. (voltage range: 2.0-4.8 V, current density: 42.5 mA/g). Each measurement was started from the beginning of charging the cell. The charge/discharge characteristics were also evaluated at varying temperatures of 0 and −20° C. during discharging. As to the discharge test at −20° C., the evaluation was performed at varying current densities of 42.5 mA/g and 8.5 mA/g. Prior to the discharge test at each temperature, each lithium cell was charged, discharged and then charged at 30° C. and the same current density as in the test.

FIGS. 15(a) and 15(b) are graphs illustrating the discharge characteristics of each type of lithium cell using the positive electrode material according to Example 6 (solid line) or Comparative Example 2 (dashed line) at the aforementioned three different temperatures (30, 0 and −20° C.) after being charged to 4.8 V at 30° C. Table 9 below presents the charge/discharge data obtained in this test.

TABLE 9

| | Discharge capacity/ (mAh/g) at 30° C. and a current density of 42.5 mA/g | Discharge capacity/ (mAh/g) at 0° C. and a current density of 42.5 mA/g | Discharge capacity/ (mAh/g) at −20° C. and a current density of 8.5 mA/g |
|---|---|---|---|
| Ex. 6 | 229 | 154 | 103 |
| Comp. Ex. 2 | 193 | 101 | 59 |

Figure 15:
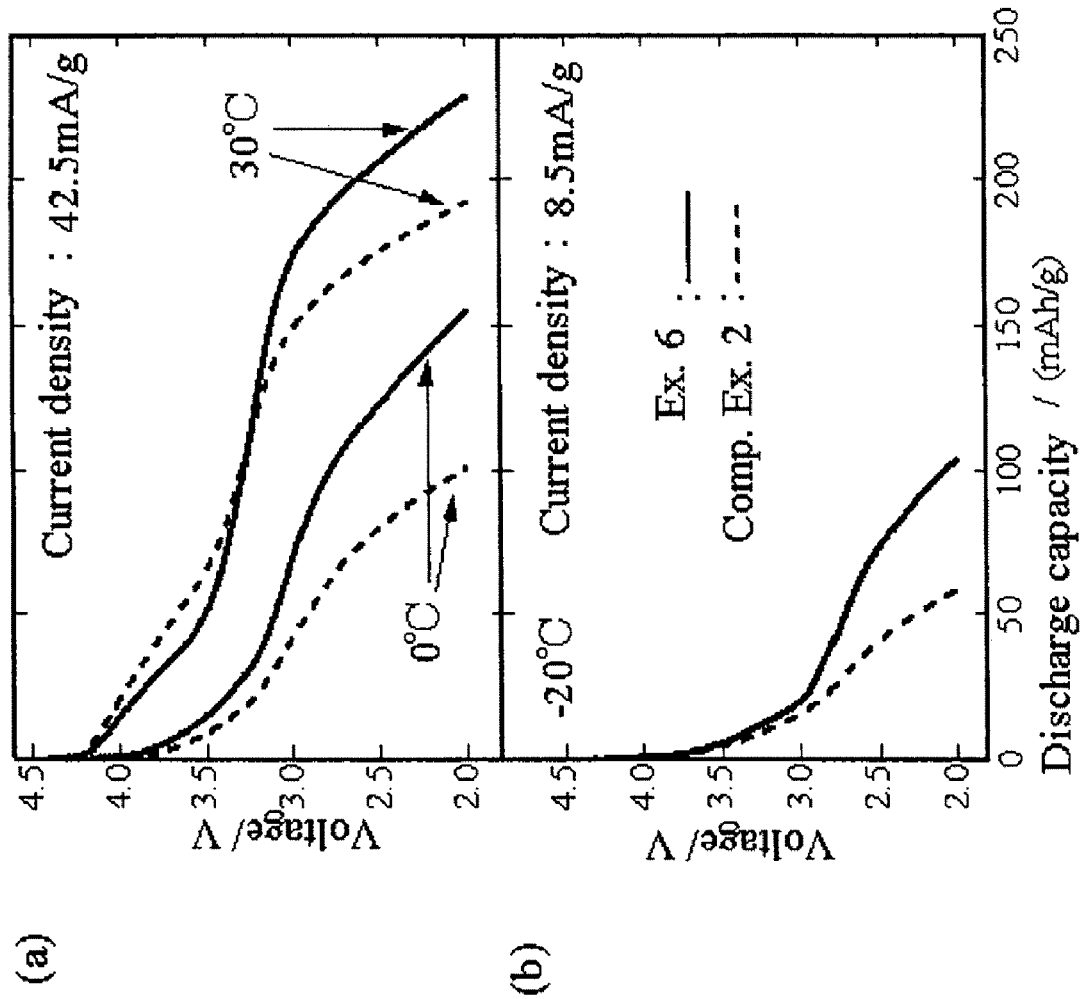
FIG. 15 (a) is a graph illustrating the initial discharge characteristics of coin-type lithium cells each using a sample according to Example 6 or Comparative Example 2 as positive electrode materials which were measured at 30 and 0° C. and a current density of 42.5 mA/g after charging to 4.8 V at 30° C.

It is clear from FIG. 15 and Table 9 that the cell using the iron- and titanium-containing $Li_2MnO_3$ positive electrode material according to Example 6 exhibits, at every temperature and every current density, a discharge capacity higher than that of the cell using the iron-containing $Li_2MnO_3$ positive electrode material according to Comparative Example 2.

The aforementioned results confirmed that the iron- and titanium-containing $Li_2MnO_3$ composite oxide of the invention exhibits excellent discharge characteristics, not only in the charge/discharge test at 30° C., i.e., room temperature, but also when operating at low temperatures of 0 and −20° C., thus having excellent performance as a lithium manganese-based positive electrode material for use in lithium-ion batteries.

Furthermore, coin-type lithium cells were prepared, using a positive electrode material obtained by dry-blending 20 mg of a composite oxide according to Example 6 or composite oxide according to Comparative Example 2 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 30° C. in the voltage range of 2.0-4.8 V. Each measurement was started from the beginning of charging the cell. In addition, with 1 C being defined as a current density of 127.5 mA/g, the charge/discharge characteristics of each type of lithium cell were evaluated at varying discharge current densities of 42.5 mA/g (⅓ C), 127.5 mA/g (1 C), 255 mA/g (2 C), 382.5 mA/g (3 C), 637.5 mA/g (5 C) and 1275 mA/g (10 C). For each discharge test, the cell was charged to 4.8 V at a fixed current density of ⅓ C (42.5 mA/g). Prior to the discharge test at each current density, each lithium cell was charged, discharged and then charged at 30° C. and the fixed current density of 42.5 mA/g.

Figure 16:
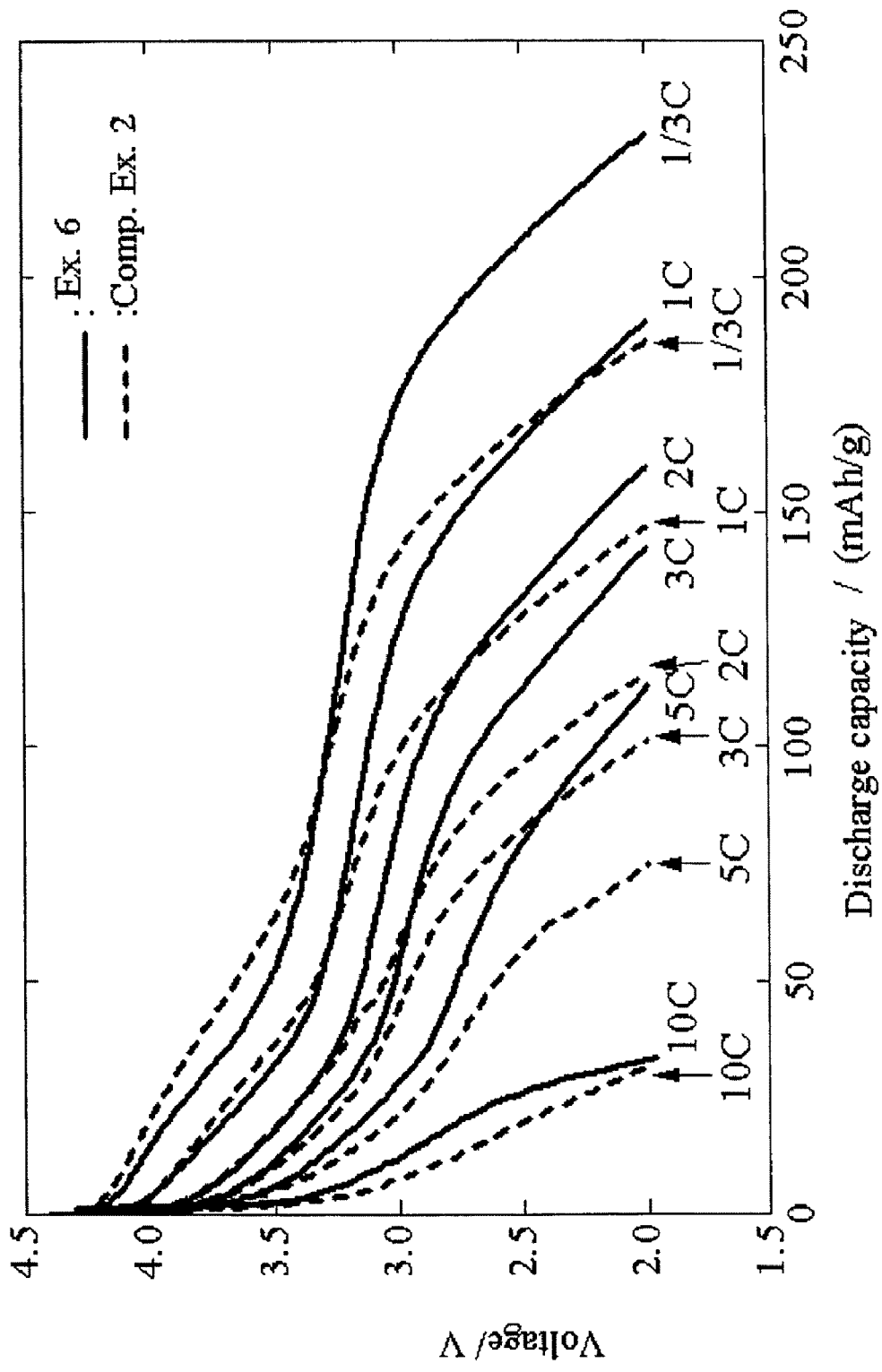
FIG. 16 is a graph illustrating the initial discharge characteristics of coin-type lithium cells each using a sample according to Example 6 or Comparative Example 2 as positive electrode materials which were measured by charging to 4.8 V at 30° C. and a current density of 42.5 mA/g and then discharging to 2.0 V at current densities varied to a maximum of 10 C.

FIG. 16 is a graph illustrating the discharge characteristics of each type of lithium cell using the positive electrode material according to Example 6 (solid line) or Comparative Example 2 (dashed line) at the aforementioned six different current densities after being charged to 4.8 V at 30° C. Table 10 below presents the discharge capacity values obtained in this test.

TABLE 10

| | Discharge capacity (⅓ C)/ (mAh/g) | Discharge capacity (1 C)/ (mAh/g) | Discharge capacity (2 C)/ (mAh/g) | Discharge capacity (3 C)/ (mAh/g) | Discharge capacity (5 C)/ (mAh/g) | Discharge capacity (10 C)/ (mAh/g) |
|---|---|---|---|---|---|---|
| Ex. 6 | 230 | 190 | 160 | 143 | 113 | 33 |
| Comp. Ex. 2 | 186 | 147 | 116 | 102 | 75 | 31 |

A current density of 127.5 mA/g is defined as 1 C.

It is clear from FIG. 16 and Table 10 that the cell using the iron- and titanium-containing $Li_2MnO_3$ positive electrode material according to Example 6 has, at every current density, a discharge capacity higher than that of the cell using the iron-containing positive electrode material according to Comparative Example 2. Moreover, the cell using the positive electrode material according to Example 6 has a higher average voltage at 10 C although the difference in discharge capacity is small, thus showing improved discharge characteristics at high current densities due to the presence of Ti.

Furthermore, for evaluation of the discharge characteristics at current densities as high as 20 C or more, coin-type lithium cells using the positive electrode material according to Example 6 or Comparative Example 2 were prepared in the same manner as described above, except that the amount of the positive electrode active material was reduced to 5 mg from 20 mg. The charge/discharge characteristics of each type of lithium cell were studied at 30° C. in the voltage range of 2.0 to 4.8 V. Each measurement was started from the beginning of charging the cell. In addition, with 1 C being defined as a current density of 127.5 mA/g, the charge/discharge characteristics of each type of lithium cell were evaluated at varying discharge current densities of 2550 mA/g (20 C), 3825 mA/g (30 C) and 7650 mA/g (60 C). For each discharge test, the cell was charged to 4.8 V at a fixed current density of ⅓ C (42.5 mA/g). Prior to the discharge test at each current density, each lithium cell was charged, discharged and then charged at 30° C. and the fixed current density of 42.4 mA/g.

Figure 17:
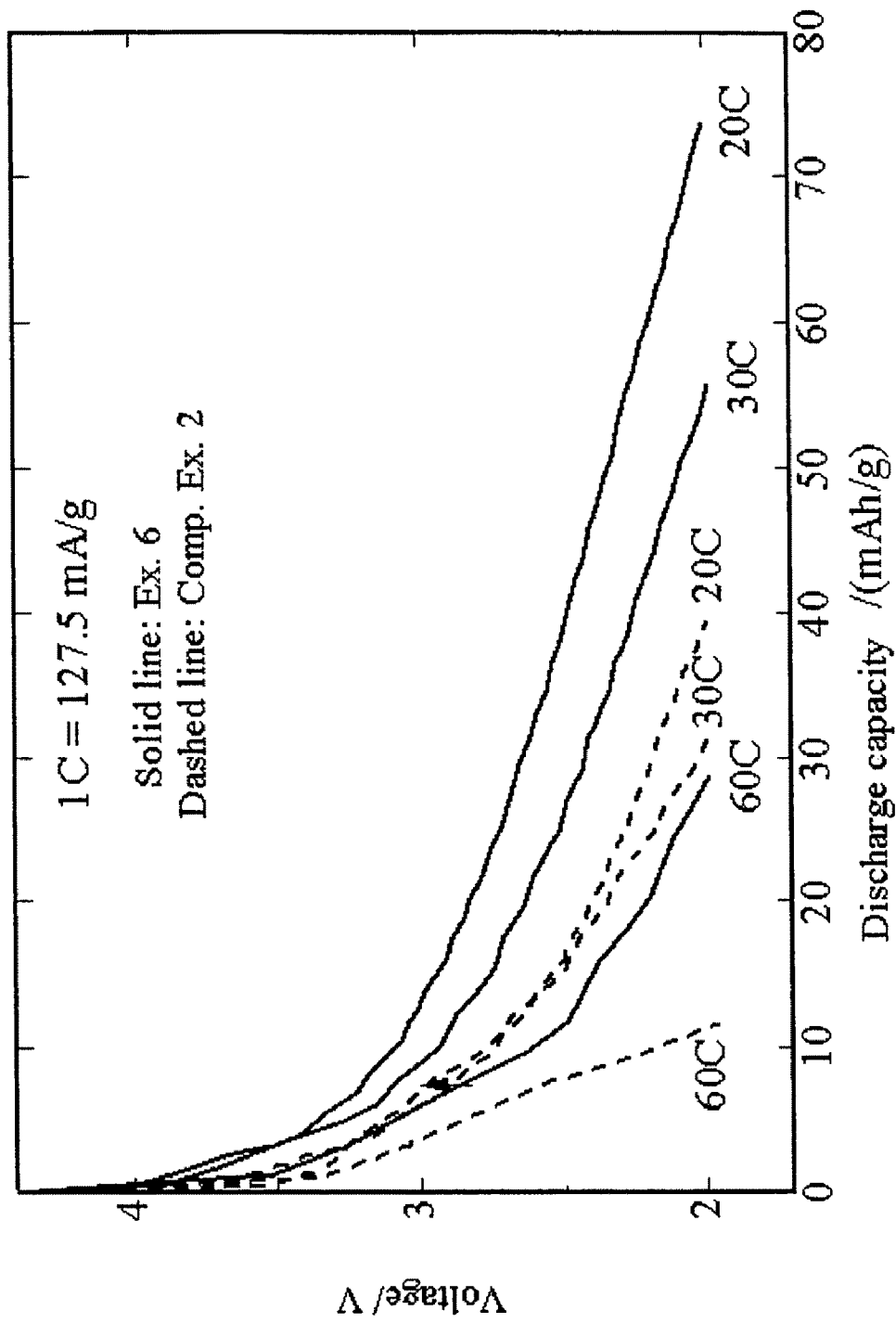
FIG. 17 is a graph illustrating the initial discharge characteristics of coin-type lithium cells each using a sample according to Example 6 or Comparative Example 2 as positive electrode materials which were measured by charging to 4.8 V at 30° C. and 42.5 mA/g, and then discharging to 2.0 V at varying current densities of 20, 30 and 60 C.

FIG. 17 is a graph illustrating the discharge characteristics of each type of lithium cell using the positive electrode material according to Example 6 (solid line) or Comparative Example 2 (dashed line) at the aforementioned three different current densities after being charged to 4.8 V at 30° C. Table 11 below presents the discharge capacity values obtained in this test.

TABLE 11

| | Discharge capacity (20 C)/ (mAh/g) | Discharge capacity (30 C)/ (mAh/g) | Discharge capacity (60 C)/ (mAh/g) |
|---|---|---|---|
| Ex. 6 | 74 | 56 | 29 |
| Comp. Ex. 2 | 39 | 31 | 12 |

A current density of 127.5 mA/g is defined as 1 C.

It is clear from FIG. 17 and Table 11 that the cell using the iron- and titanium-containing $Li_2MnO_3$ positive electrode material according to Example 6, compared to the cell using the iron-containing positive electrode material according to Comparative Example 2, has less voltage reduction even at current densities as high as 20 C or more, and shows high discharge capacity.

Example 7

To 500 mL of distilled water was added 24.73 g of a manganese (II) chloride tetrahydrate and 100.00 g of a 30% aqueous titanium sulfate solution (total amount: 0.25 mol, Mn:Ti molar ratio: 1:1), and thoroughly dissolved. An aqueous lithium hydroxide solution (a solution of 100 g of a lithium hydroxide monohydrate dissolved in 1000 mL of distilled water) was prepared in a separate beaker. After pouring this aqueous lithium hydroxide solution into a titanium beaker, 400 mL of ethanol was added and stirred. The lithium hydroxide solution was then allowed to stand in a thermostat at a constant temperature of −10° C. The aqueous solution of metal salts obtained above was then added dropwise into the aqueous lithium hydroxide solution over a period of 2 to 3 hours, thus forming a Mn—Ti precipitate. After confirming that the solution had been made completely alkaline (a pH of 11 or more), the solution containing the coprecipitate was oxidized while stirring by bubbling air through the solution at room temperature for 2 days, to age the precipitate.

The resulting precipitate was washed with distilled water and filtered. The precipitate product was then placed into a polytetrafluoroethylene beaker along with 50 g of a lithium hydroxide monohydrate, 50 g of potassium chlorate, 309 g of potassium hydroxide and 600 mL of distilled water and stirred well. The mixture had a pH of 11 or more. The mixture was then placed in a hydrothermal reactor (autoclave) and hydrothermally treated at 220° C. for 5 hours.

After the completion of the hydrothermal treatment, the reactor was cooled to about room temperature, and the beaker containing the hydrothermally reacted solution was taken out from the autoclave. The formed precipitate was washed with distilled water to remove salts such as excess lithium hydroxide and filtered to obtain a powdery product (lithium manganese-based composite oxide).

The filtered powder was mixed with an aqueous lithium hydroxide solution of 5.25 g of a lithium hydroxide monohydrate dissolved in 100 mL of distilled water and stirred. The mixture was then dried at 100° C. overnight and pulverized to form a powder.

The powder was then heated in air to 550° C. over 1 hour. After firing at that temperature for 1 minute, the powder was cooled to about room temperature in a furnace, and then the fired product was washed with distilled water to remove excess lithium salts, filtered and dried to obtain the target titanium-containing $Li_2MnO_3$ as a powdery product.

Figure 18:
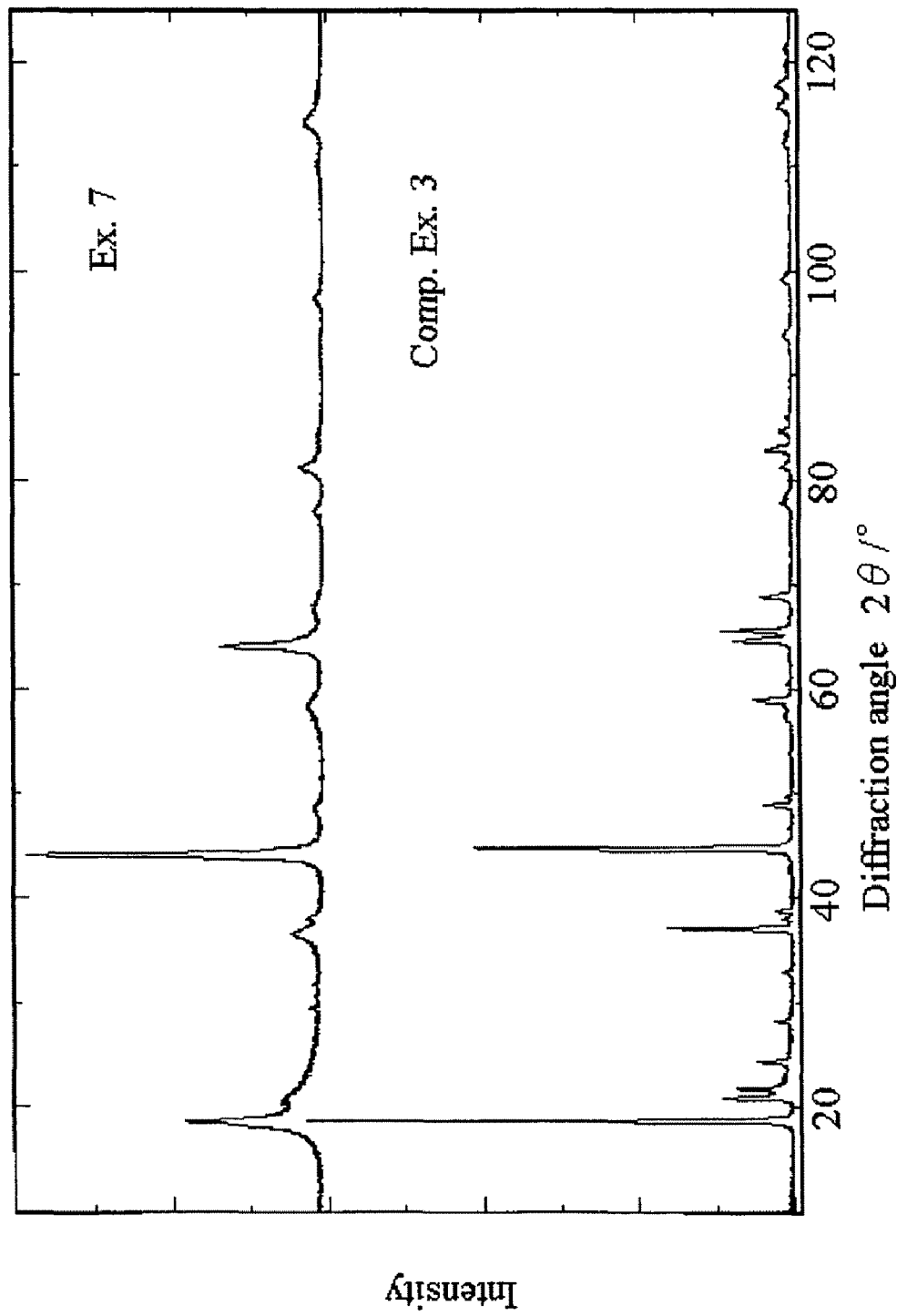
FIG. 18 is a graph showing the X-ray diffraction patterns of samples according to Example 7 and Comparative Example 3.

The X-ray diffraction pattern of this product is shown in FIG. 18. According to a Rietveld analysis (using RIETAN-2000), all of the peaks, except for the small peaks at 2θ=25-35° of a small amount of $Li_2CO_3$ and the like, were indexed by a crystal phase with a unit cell (R $\bar{3}$ m) of layered rock-salt type iron-containing $Li_2MnO_3$ (first phase: a=2.8788(14) Å, c=14.274(5) Å) and a crystal phase with a unit cell (Fm $\bar{3}$ m) of cubic rock-salt type α-$LiFeO_2$ (second phase: a=4.1060(5) Å, the weight ratio of the first and second phases: 48:52).

Chemical analysis (Table 2 above) shows that the Ti content is 49 mol % (value n), which is close to the amount supplied, and the value x calculated from the value Li/(Mn+Ti) is 0.28; hence it was confirmed that titanium-containing $Li_2MnO_3$ ($Li_{1.28}(Mn_{0.51}Ti_{0.49})_{0.72}O_2$) was obtained in Example 7.

Observation of an electron micrograph of the final product, titanium-containing $Li_2MnO_3$, obtained in Example 7 confirmed the formation of titanium-containing $Li_2MnO_3$ composed of agglomerates of particles with a diameter of 100 nm or less. Moreover, a comparison with the electron micrograph of a sample according to Comparative Example 3 below showed that titanium-containing $Li_2MnO_3$ according to Example 7 had a particle diameter smaller than that of the sample according to Comparative Example 3. The specific surface area of the sample according to Example 7 is 39.2 $m^2/g$, which is greater than that of the sample according to Comparative Example 3 (6.6 $m^2/g$), establishing that the sample according to Example 7 is composed of particles smaller than those of the sample according to Comparative Example 3.

Comparative Example 3

Following the procedure of Example 7, except that an aqueous solution prepared by adding 59.42 g of a manganese (II) chloride tetrahydrate (total amount: 0.25 mol) to 500 mL of distilled water was used instead of the aqueous solution prepared by adding manganese (II) chloride tetrahydrate and 30% aqueous titanium sulfate solution to 500 mL of distilled water, a precipitate was formed by adding this aqueous solution dropwise into an aqueous lithium hydroxide solution, and then the precipitate was aged, hydrothermally treated, washed with water and filtered to obtain a lithium manganese-based composite oxide.

This powder was then mixed with an aqueous lithium hydroxide solution of 10.49 g of a lithium hydroxide monohydrate dissolved in 150 mL of distilled water. The mixture was then dried at 100° C. and pulverized to form a powdery product. The powdery product was then heated in air to 750° C. over 1 hour. After firing at that temperature for 20 hours, the product was cooled to about room temperature in a furnace. The fired product was then washed with distilled water to remove excess lithium salts, filtered and dried to obtain $Li_2MnO_3$ as a powdery product.

The X-ray diffraction pattern of this product is shown in FIG. 18. All of the peaks were indexed by a monoclinic crystal phase with a unit cell C2/c of a layered rock-salt type structure (a=4.9231(4) Å, b=8.5263(7) Å, c=9.6017(6) Å, β=99.657(6)°). The lattice parameters of the layered rock-salt type crystal phase obtained were close to the values reported for existing $Li_2MnO_3$ (lattice parameters: a=4.921(6) Å, b=8.526(3) Å, c=9.606(5) Å, β=99.47(5)°) (Y. Riou, A. Lecerf, Y. Gerault and Y. Cudennec, Material Research Bulletin, 27, 269-275, (1992)).

Chemical analysis (Table 2 above) shows that Mn is present, and the value x calculated from the value Li/Mn is 0.35; hence the sample according to Comparative Example 2 has an average composition of ($Li_{1.35}Mn_{0.65}O_2$). As this composition substantially coincides with the compositional formula $Li_{1.33}Mn_{0.67}O_2$ estimated from the chemical formula of $Li_2MnO_3$, it was clarified that $Li_2MnO_3$ was formed in accordance with Comparative Example 3.

The results of chemical analysis shown in Table 2 confirmed that the sample according to Comparative Example 3 had a Li content higher than that of the sample according to Example 7, showing that a lack of Li was prevented by firing at a high temperature for a long period.

Observation of an electron micrograph of the final product $Li_2MnO_3$ obtained in Comparative Example 3 confirmed the formation of $Li_2MnO_3$ composed of agglomerates with a particle of 100 nm or less. A comparison with the sample according to Example 7 showed that the sample according to Comparative Example 3 has a greater particle diameter. The specific surface area of the sample according to Comparative Example 3 is 6.6 m²/g, which is smaller than that of the sample according to Example 7 (39.2 m²/g), establishing that the sample according to Comparative Example 3 is composed of particles greater than those of the sample according to Example 7.

The aforementioned results show that although a lack of Li was prevented in the sample according to Comparative Example 3 by elevating the firing temperature without the addition of titanium sulfate, this resulted in particle growth.

Charge/Discharge Test

Coin-type lithium cells were prepared, using a positive electrode material obtained by dry-blending 20 mg of a composite oxide according to Example 7 or composite oxide according to Comparative Example 3 with 5 mg of acetylene black and 0.5 mg of PTFE powder; a negative electrode material comprising Li metal; an electrolyte composed of a 1 M solutions containing $LiPF_6$ dissolved in a solvent mixture of ethylene carbonate and dimethyl carbonate. The charge/discharge characteristics of each type of lithium cell were studied at 30° C. (voltage range: 2.0-4.8 V, current density: 42.5 mA/g). Each measurement was started from the beginning of charging the cell. The temperature during discharging was also varied to 0 and −20° C., in addition to 30° C. As to the discharge test at −20° C., the evaluation was also performed at a reduced current density of 8.5 mA/g. Prior to the discharge test at each temperature, each lithium cell was charged, discharged and then charged at 30° C. and the same current density as in each test.

Figure 19:
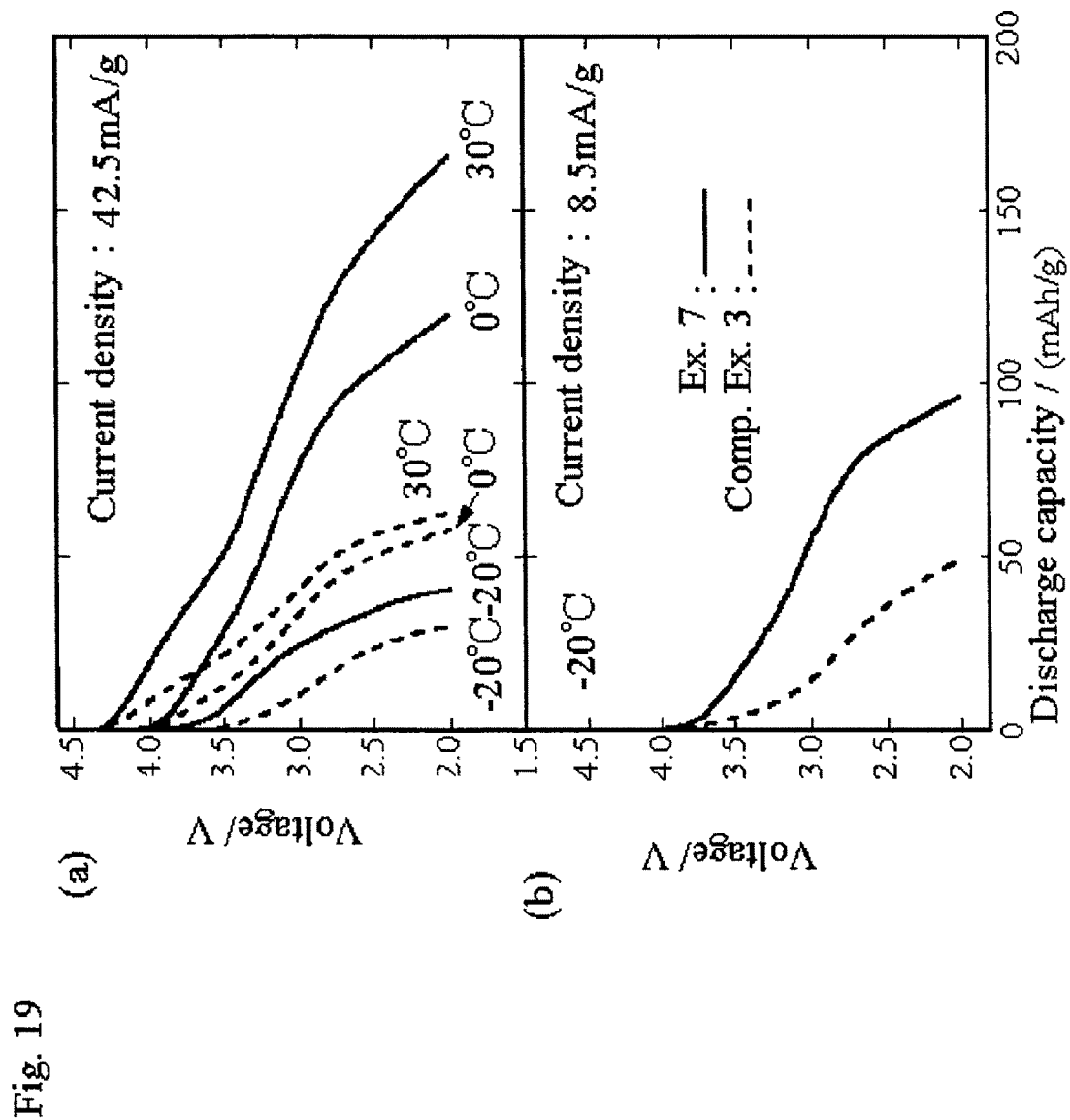
FIG. 19 (a) is a graph illustrating the initial discharge characteristics of coin-type lithium cells each using a sample according to Example 7 or Comparative Example 3 as positive electrode materials which were measured at 30, 0 and −20° C. and a current density of 42.5 mA/g after charging to 4.8 V at 30° C.

FIGS. 19 (a) and 19 (b) are graphs illustrating the discharge characteristics of each type of lithium cell using the positive electrode material according to Example 7 (solid line) or Comparative Example 3 (dashed line) at the three different temperatures (i.e., 30, 0 and −20° C.) after being charged to 4.8 V at 30° C. Table 12 below presents the charge/discharge data obtained in this test.

TABLE 12

| | Discharge capacity/ (mAh/g) at 30° C. and a current density of 42.5 mA/g | Discharge capacity/ (mAh/g) at 0° C. and a current density of 42.5 mA/g | Discharge capacity/ (mAh/g) at −20° C. and a current density of 42.5 mA/g | Discharge capacity/ (mAh/g) at −20° C. and a current density of 8.5 mA/g |
|---|---|---|---|---|
| Ex. 7 | 166 | 120 | 41 | 97 |
| Comp. Ex. 3 | 77 | 58 | 30 | 55 |

It is clear from FIG. 19 and Table 12 that the cell using the titanium-containing $Li_2MnO_3$ positive electrode material according to Example 7, compared to the cell using the $Li_2MnO_3$ positive electrode material according to Comparative Example 3, exhibits a higher discharge capacity and less voltage reduction at every temperature.

Furthermore, coin-type lithium cells were prepared, using a positive electrode material obtained by dry-blending 20 mg of a composite oxide according to Example 7 or composite oxide according to Comparative Example 3 with 5 mg of acetylene black and 0.5 mg of PTFE powder; a negative electrode material comprising Li metal; an electrolyte of a 1 M solution containing $LiPF_6$ dissolved in a solvent mixture of ethylene carbonate and dimethyl carbonate. The charge/discharge characteristics of each type of lithium cell were studied at 30° C. in the voltage range of 2.0-4.8 V. Each measurement was started from the beginning of charging the cell. In addition, with 1 C being defined as a current density of 127.5 mA/g, the charge/discharge characteristics of each type of lithium cell were evaluated at varying discharge current densities of 127.5 mA/g (1 C), 637.5 mA/g (5 C), 1275 mA/g (10 C), 2550 mA/g (20 C), 3825 mA/g (30 C) and 7650 mA/g (60 C). Prior to the discharge test at each current density, each lithium cell was charged, discharged and then charged at 30° C. and a current density of ⅓ C.

Figure 20:
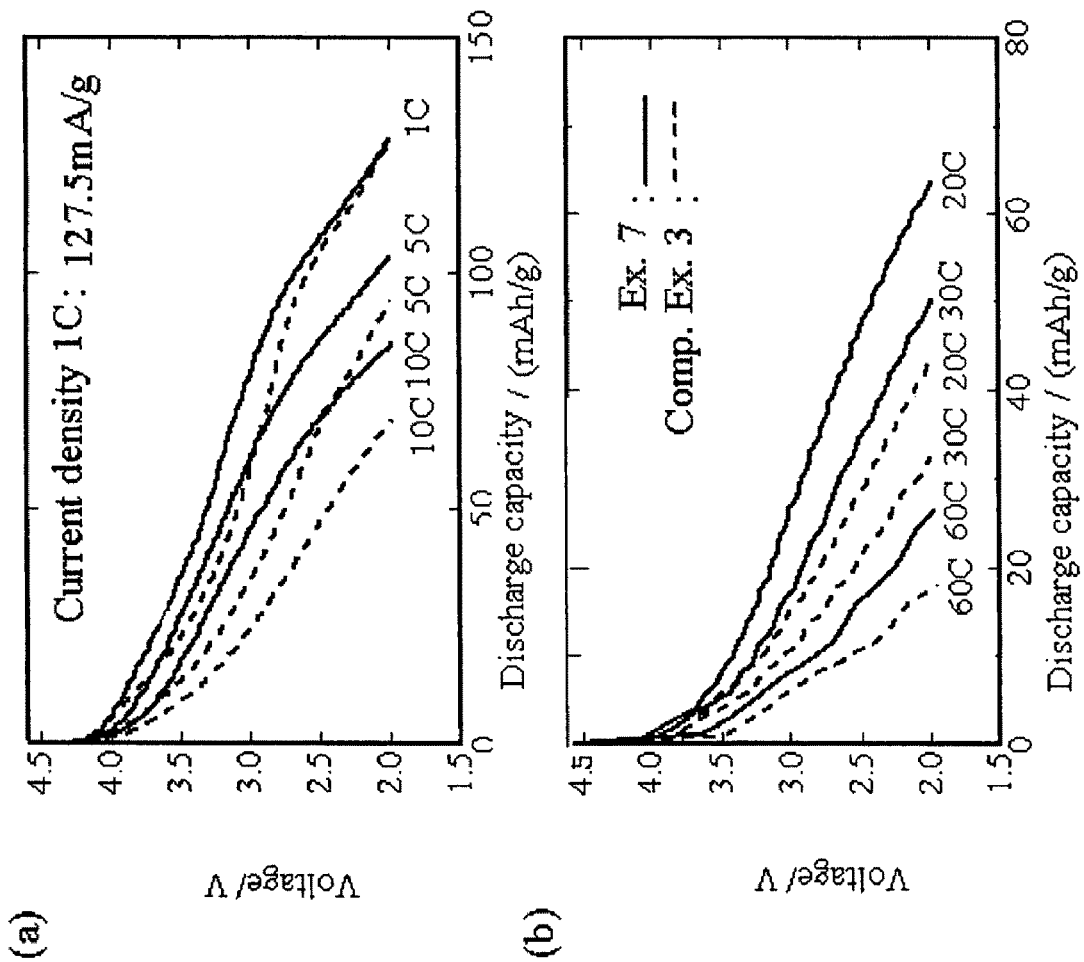
FIGS. 20 (a) and (b) are graphs illustrating the initial discharge characteristics of coin-type lithium cells each using a sample according to Example 7 or Comparative Example 3 as positive electrode materials which were measured by charging to 4.8 V at 30° C. and 42.5 mA/g, and then discharging to 2.0 V at current densities varied to a maximum of 60 C.

FIGS. 20 (a) and 20 (b) are graphs illustrating the discharge characteristics of each type of lithium cell using the positive electrode material according to Example 7 (solid line) or Comparative Example 3 (dashed line) at the aforementioned six different current densities after being charged to 4.8 V at 30° C. Table 13 below presents the discharge capacity values obtained in this test.

TABLE 13

| | Discharge capacity (1 C)/ (mAh/g) | Discharge capacity (5 C)/ (mAh/g) | Discharge capacity (10 C)/ (mAh/g) | Discharge capacity (20 C)/ (mAh/g) | Discharge capacity (30 C)/ (mAh/g) | Discharge capacity (60 C)/ (mAh/g) |
|---|---|---|---|---|---|---|
| Ex. 7 | 141 | 104 | 85 | 64 | 50 | 27 |
| Comp. Ex. 3 | 128 | 94 | 69 | 44 | 32 | 18 |

A current density of 127.5 mA/g is defined as 1 C.

It is clear from FIG. 20 and Table 13 that the cell using the titanium-containing $Li_2MnO_3$ positive electrode material according to Example 7, compared to the cell using the $Li_2MnO_3$ positive electrode material according to Comparative Example 3, exhibits a higher discharge capacity and less voltage reduction at every current density up to 60 C.

Comparative Example 4

A precipitate was formed from an aqueous solution containing 59.42 g of manganese (II) chloride tetrahydrate (total amount: 0.25 mol) dissolved in 500 mL of distilled water by adding this solution dropwise into an aqueous lithium hydroxide solution. The precipitate was then aged, hydrothermally treated, washed with water and filtered to obtain a lithium manganese-based composite oxide. The above procedure was performed under the same conditions as in Comparative Example 3.

This powder was then mixed with an aqueous lithium hydroxide solution of 10.49 g of a lithium hydroxide monohydrate dissolved in 150 mL of distilled water. The mixture was then dried at 100° C. and pulverized to form a powdery product. The powdery product was then heated in air to 750° C. over 1 hour. After firing at that temperature for 1 minute, the product was cooled to about room temperature in a furnace. The fired product was then washed with distilled water to remove excess lithium salts, filtered and dried to obtain a powdery product.

Figure 21:
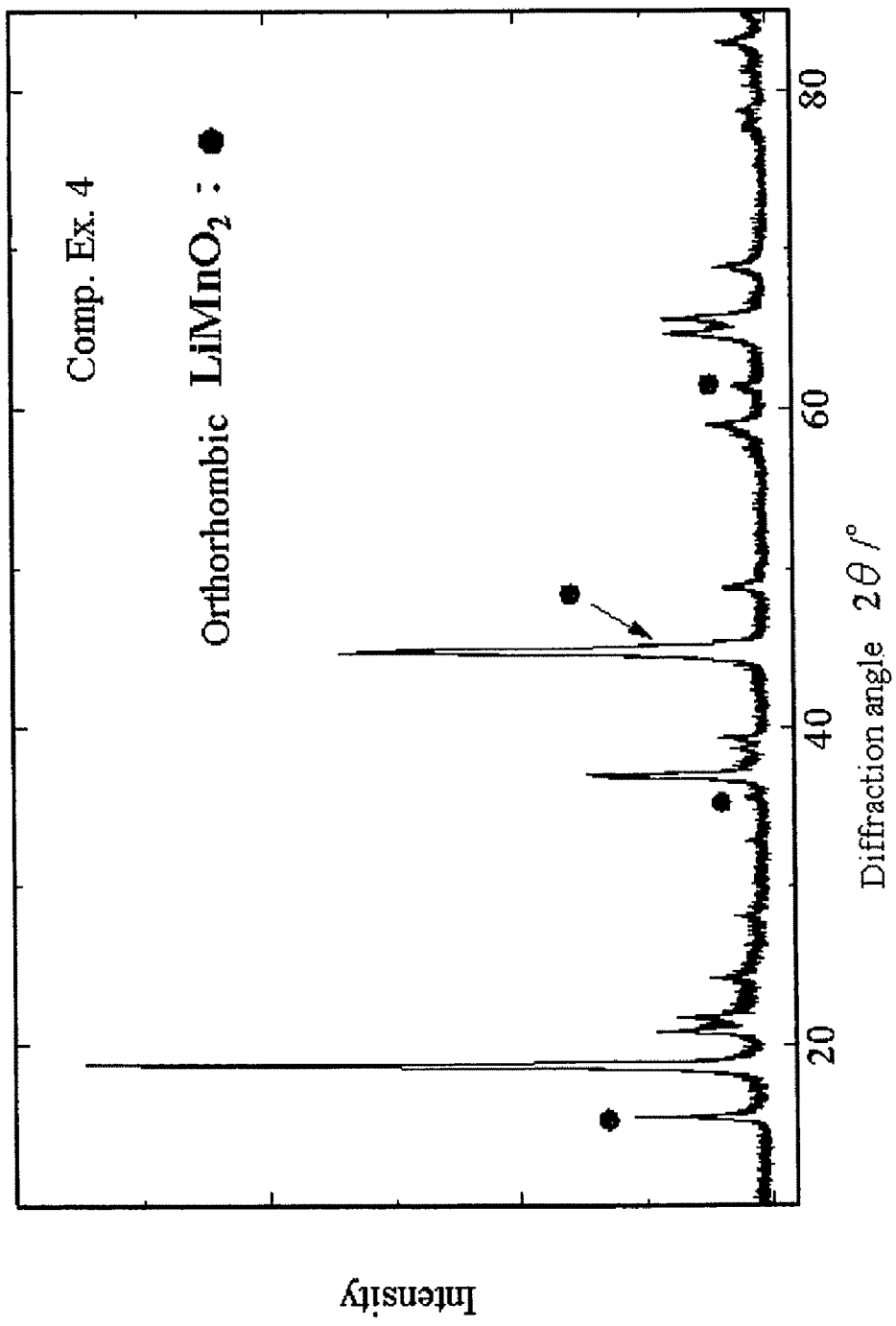
FIG. 21 is a graph showing the X-ray diffraction pattern of a sample according to Comparative Example 4.

FIG. 21 is a graph showing the X-ray diffraction pattern of this product. In FIG. 21, the peaks indicated by the black circles originate from an impurity phase, orthorhombic $LiMnO_2$, and all of the other peaks originate from monoclinic $Li_2MnO_3$. It was clearly confirmed from FIG. 21 that the product according to Comparative Example 4 includes orthorhombic $LiMnO_2$, as indicated by the black circles, in addition to $Li_2MnO_3$ present in the product according to Comparative Example 3. Based on the fact that $Li_2MnO_3$ is a compound in which the manganese has a valence of 4, and the Li/Mn ratio is 2, while orthorhombic $LiMnO_2$ is a compound in which the manganese has a valence of 3, and the Li/Mn ratio is 1, it appears that because the firing time was as short as about 1 minute without adding titanium sulfate, the valence of manganese did not increase sufficiently, and the reaction with Li was poor, resulting in the presence of orthorhombic LiMnO$_2$. Orthorhombic LiMnO$_2$ has been reported to produce two plateaus at 4 V and 3 V in the charge/discharge curves due to its change in crystal structure during charging/discharging. Hence, orthorhombic LiMnO$_2$ is not a preferable material for use in batteries, so that the formation thereof during preparation has to be prevented.

A comparison between the result of Comparative Example 4 and the results of each of the Examples above clarifies that the addition of titanium sulfate during preparation effectively prevents the formation of orthorhombic LiMnO$_2$.

As can be clearly seen from the results of Examples and Comparative Examples above, it was confirmed that Li$_2$MnO$_3$-based composite oxides containing iron and titanium as well as Li$_2$MnO$_3$-based composite oxides containing titanium according to the invention exhibit excellent discharge characteristics, not only at a temperature as high as 60° C. but also when discharged at increased current densities at 30° C. or discharged at low temperatures down to −20° C., hence having excellent performance as lithium manganese-based positive electrode materials for use in lithium-ion batteries. It was also clarified that the presence of Ti prevents the formation of the impurity, LiMnO$_2$, during preparation, hence also being very useful in the preparation process.

The invention claimed is:

1. A lithium manganese-based composite oxide represented by the compositional formula:

$$Li_{1+x}(Mn_{1-m-n}Fe_mTi_n)_{1-x}O_2$$

wherein $0.17 \leq x \leq 0.28$, $0 \leq m \leq 0.75$, $0.01 \leq n \leq 0.75$, and $0.01 \leq m+n < 1$, the composite oxide comprising a crystal phase of layered rock-salt type structure.

2. The lithium manganese-based composite oxide according to claim 1, wherein $0.01 \leq n \leq 0.5$ in the compositional formula:

$$Li_{1+x}(Mn_{1-m-n}Fe_mTi_n)_{1-x}O_2.$$

3. The lithium manganese-based composite oxide according to claim 1, wherein $0.17 \leq x \leq 0.28$, $0.05 \leq m \leq 0.75$, $0.01 \leq n \leq 0.75$, and $0.06 \leq m+n < 1$ in the compositional formula: $Li_{1+x}(Mn_{1-m-n}Fe_mTi_n)_{1-x}O_2$.

4. The lithium manganese-based composite oxide according to claim 1, comprising a crystal phase of layered rock-salt type structure and a crystal phase of cubic rock-salt type structure.

5. A method for preparing a lithium manganese-based composite oxide as defined in claim 1, comprising forming a precipitate by alkalizing an aqueous solution containing a manganese compound, a titanium compound, and an iron compound; hydrothermally treating the precipitate along with an oxidizing agent and a water-soluble lithium compound under alkaline conditions; and firing the hydrothermally treated product in the presence of a lithium compound.

6. A positive electrode material for a lithium-ion battery, comprising a lithium manganese-based composite oxide represented by the compositional formula:

$$Li_{1+x}(Mn_{1-m-n}Fe_mTi_n)_{1-x}O_2$$

wherein $0.17 \leq x \leq 0.28$, $0 \leq m \leq 0.75$, $0.01 \leq n \leq 0.75$, and $0.01 \leq m+n < 1$, the composite oxide comprising a crystal phase of layered rock-salt type structure.

7. A lithium-ion battery, comprising a positive electrode material comprising a lithium manganese-based composite oxide represented by the compositional formula:

$$Li_{1+x}(Mn_{1-m-n}Fe_mTi_n)_{1-x}O_2$$

wherein $0.17 \leq x \leq 0.28$, $0 \leq m \leq 0.75$, $0.01 \leq n \leq 0.75$; and $0.01 \leq m+n < 1$, the composite oxide comprising a crystal phase of layered rock-salt type structure.

8. The lithium manganese-based composite oxide according to claim 2, wherein $0.17 \leq x \leq 0.28$, $0.05 \leq m \leq 0.75$, $0.01 \leq n \leq 0.75$, and $0.06 \leq m+n < 1$ in the compositional formula: $Li_{1+x}(Mn_{1-m-n}Fe_mTi_n)_{1-x}O_2$.

9. The lithium manganese-based composite oxide according to claim 2, comprising a crystal phase of layered rock-salt type structure and a crystal phase of cubic rock-salt type structure.

10. The lithium manganese-based composite oxide according to claim 3, comprising a crystal phase of layered rock-salt type structure and a crystal phase of cubic rock-salt type structure.

* * * * *